United States Patent
Fielding et al.

(10) Patent No.: US 10,157,132 B1
(45) Date of Patent: Dec. 18, 2018

(54) DATA PROCESSING SYSTEMS USING BOTH A CACHE AND A BUFFER FOR PROCESSING DATA

(71) Applicant: ARM Limited, Cambridge (GB)

(72) Inventors: Edvard Fielding, Trondheim (NO);
Andreas Due Engh-Halstvedt, Trondheim (NO); Jorn Nystad, Trondheim (NO); Antonio Garcia Guirado, Trondheim (NO); William Robert Stoye, Cambridge (GB); Ian Rudolf Bratt, Portola Valley, CA (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/661,200

(22) Filed: Jul. 27, 2017

(51) Int. Cl.
| | |
|---|---|
| *G06F 12/00* | (2006.01) |
| *G06F 13/00* | (2006.01) |
| *G06F 13/28* | (2006.01) |
| *G06F 12/0811* | (2016.01) |
| *G06F 12/0875* | (2016.01) |
| *G06F 12/0862* | (2016.01) |
| G06F 12/0846 | (2016.01) |
| G06F 12/0868 | (2016.01) |

(52) U.S. Cl.
CPC ...... *G06F 12/0811* (2013.01); *G06F 12/0862* (2013.01); *G06F 12/0875* (2013.01); *G06F 12/0848* (2013.01); *G06F 12/0868* (2013.01); *G06F 2212/283* (2013.01); *G06F 2212/455* (2013.01)

(58) Field of Classification Search
CPC ............ G06F 12/0811; G06F 12/0862; G06F 12/0875; G06F 12/0848; G06F 12/0868; G06F 2212/455; G06F 2212/283
USPC ................................. 711/122, 123, 135, 129
See application file for complete search history.

(56) References Cited

U.S. PATENT DOCUMENTS

| | | | |
|---|---|---|---|
| 2008/0024506 A1* | 1/2008 | Lindholm | G06F 12/0811 345/506 |
| 2014/0267259 A1* | 9/2014 | Frascati | G06T 15/005 345/423 |
| 2017/0053375 A1* | 2/2017 | Bolz | G06F 1/3203 |

* cited by examiner

*Primary Examiner* — Shane Woolwine

(74) *Attorney, Agent, or Firm* — Vierra Magen Marcus LLP

(57) ABSTRACT

A method of operating a data processing system comprises maintaining record of a set of processing passes to be performed by processing pass circuitry of the data processing system. The method comprises performing cycles of operation in which it is considered whether or not the data required for a subset of processing passes is stored in a local cache. The subset of processing passes that is considered in a subsequent scan of the record comprises at least one processing pass that was not considered in the previous scan of the record, regardless of whether or not the data considered in the previous scan is determined as being stored in the cache. The method provides an efficient way to identify processing passes that are ready to be performed.

19 Claims, 12 Drawing Sheets

DATA PROCESSING SYSTEMS USING BOTH A CACHE AND A BUFFER FOR PROCESSING DATA

BACKGROUND

The technology described herein relates to data processing systems and in particular to cache operation in data processing systems.

Many data processing systems use caches to store data, etc., locally to a processing unit or units so as to reduce the need to fetch data from slower data stores, such as main memory of the data processing system. In such arrangements, it will first be determined whether the data is available in the appropriate cache. If the data is present in the cache (there is a cache "hit"), then the data can be read from the cache, rather than from the main data store where it is stored, thereby allowing the processing operation to proceed more rapidly. On the other hand, if the data is not present in the cache (there is a cache "miss"), then the process will operate to first fetch the relevant data into the cache, with the processing operation being stalled until the relevant data is stored in the cache.

The Applicants believe that there remains scope for improvements to cache operation in data processing system.

BRIEF DESCRIPTION OF THE DRAWINGS

Embodiments of the technology described herein will now be described by way of example only and with reference to the accompanying drawings, in which.

Like reference numerals are used for like components where appropriate in the drawings.

DETAILED DESCRIPTION

Figure 1:
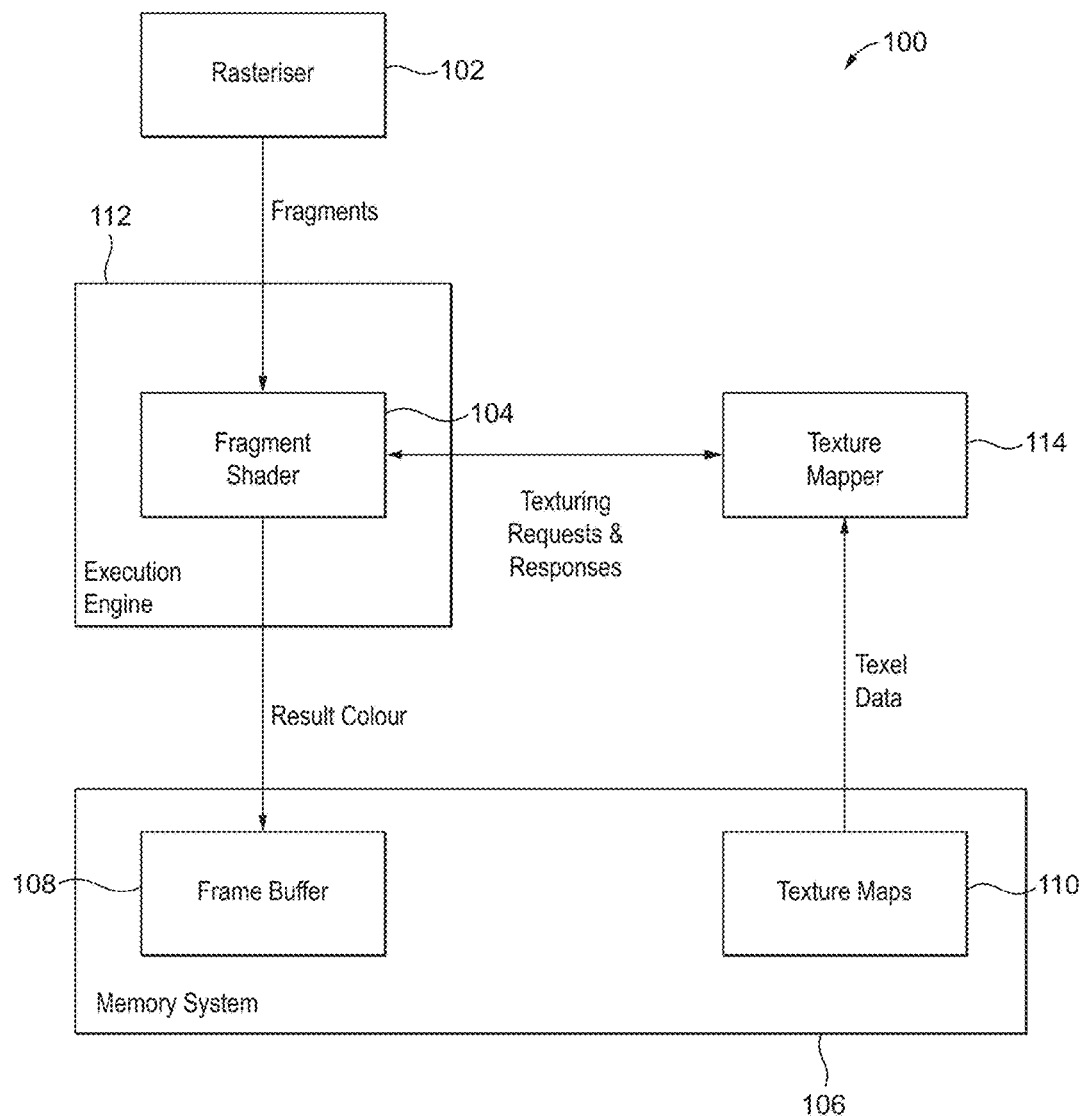
FIG. 1 shows schematically a graphics processing system according to an embodiment of the present technology.

An embodiment of the technology described herein comprises a method of operating a data processing system that comprises processing pass circuitry configured to perform processing passes for one or more data processing operations, the method comprising:

storing, in a cache that is local to the processing pass circuitry, data required by the processing pass circuitry when performing processing passes for one or more data processing operations; and storing, in a buffer, a record of a set of processing passes to be performed by the processing pass circuitry for one or more data processing operations;

the method further comprising:

in a first cycle of operation, performing a first scan of the record of processing passes, wherein the first scan comprises considering a first subset of one or more of, but not all of, the set of processing passes in the record of processing passes, and wherein considering the first subset comprises determining whether or not data that is required when performing the one or more processing passes of the first subset is stored in the cache; and in a second cycle of operation, performing a second scan of the record of processing passes, wherein the second scan comprises considering a second subset of one or more of, but not all of, the set of processing passes in the record of processing passes, and wherein considering the second subset comprises determining whether or not data that is required when performing the one or more processing passes of the second subset is stored in the cache;

wherein the second subset that is considered in the second scan comprises at least one processing pass that was not considered in the first scan, regardless of whether or not data that is required when performing the one or more processing passes of the first subset is stored in the cache.

Another embodiment of the technology described herein comprises a data processing system, the system comprising:

processing pass circuitry configured to perform processing passes for one or more data processing operations;

a cache that is local to the processing pass circuitry, the cache being configured to store data required by the processing pass circuitry when performing processing passes for one or more data processing operations;

a buffer configured to store a record of a set of processing passes to be performed by the processing pass circuitry for one or more data processing operations; and buffer management circuitry configured to:

in a first cycle of operation, perform a first scan of the record of processing passes, wherein the first scan comprises considering a first subset of one or more of, but not all of, the set of processing passes in the record of processing passes, and wherein considering the first subset comprises determining whether or not data that is required when performing the one or more processing passes of the first subset is stored in the cache; and in a second cycle of operation, perform a second scan of the record of processing passes, wherein the second scan comprises considering a second subset of one or more of, but not all of, the set of processing passes in the record of processing passes, and wherein considering the second subset comprises determining whether or not data that is required when performing the one or more processing passes of the second subset is stored in the cache;

wherein the second subset that is considered in the second scan comprises at least one processing pass that was not considered in the first scan, regardless of whether or not data that is required when performing the one or more processing passes of the first subset is stored in the cache.

The present technology relates to arrangements in which a record of processing passes to be performed by processing pass circuitry is maintained in a buffer (a "parking buffer"). This can be useful, for example, for keeping track of processing passes that cannot necessarily be performed straightaway, for example because the data required for performing those processing passes may not yet have been cached.

The Applicants have recognised that, in arrangements in which such a record of processing passes is stored, the processing passes in the record could be considered on a First-In-First-Out (FIFO) basis. In such arrangements, when it is determined that the data required for a first (older) processing pass in the record has been cached, then that processing pass could be output from the record, the required data could be loaded from the cache, and the processing pass could be performed using the loaded data. Only once this has happened, a second (newer) processing pass could then be considered, and so on. These arrangements would be simple to implement. However, the Applicants have recognised that these arrangements can also be inefficient, since newer processing passes may be stalled for many cycles of operation by an older processing pass that is waiting for its data to be cached.

In the present technology, however, a subset of one or more processing passes that is considered in a subsequent (i.e. the second) scan of the record comprises at least one processing pass that was not considered in a previous (i.e. the first) scan, regardless of whether or not data considered in that previous scan is actually stored in the cache. Considering at least one new processing pass in a subsequent scan in this way can help to avoid processing passes in the record being stalled by other processing passes in the record for which the required data has not yet been cached. This in turn can improve the performance of the data processing system by increasing the throughput of processing passes that are determined as being ready to be performed.

The Applicants have further recognised that each and every processing pass in a record could be considered in every cycle of operation, e.g. so as to try to immediately identify all of the processing passes for which the required data has now been cached. The Applicants, however, have identified that these arrangements can consume significant amounts of processing resources and, as will be discussed in more detail below, can be inefficient in many cases.

In the present technology, however, a subset of one or more of, but not all of, the processing passes in the record is considered when scanning that record. This can significantly reduce the amount of processing resources needed to scan the processing passes in the record in order to identify a processing pass for which the required data has been cached. Furthermore, despite not considering all of the processing passes in the record in each scan, the present technology can still provide efficient performance in many cases, e.g. where only a few processing passes are to be performed by the data processing circuitry during each cycle of operation or every few cycles of operations, and thus where it is not necessary to immediately identify all of the processing passes in the record that are ready for processing.

The present technology is applicable to any data processing system where plural processing passes are to be performed and in which data to be used in those processing passes is to be cached. Thus, the processing passes, the data processing operations, and the data that is required when performing the processing passes may take any desired and suitable form. However, the Applicants have identified that the technology described herein is particularly suited to graphics processing. Thus, the data processing system may comprise a graphics processing system, the processing passes may comprise processing passes for graphics processing operations, and the data that is required when performing the processing passes may comprise graphics data.

Moreover, the Applicants have identified that the technology described herein is particularly suited to graphics texture processing, e.g. which typically uses many processing passes and can comprise many (texture) cache misses. Thus, the processing pass circuitry may comprise graphics texture processing pass circuitry (e.g. of a texture mapper), the processing passes may comprise processing passes for graphics texture processing operations, and the data that is required when performing the processing passes may comprise graphics texture data (texel data).

In embodiments, a data processing operation to be performed by the processing pass circuitry may comprise a filtering operation, such as bilinear interpolation, trilinear interpolation or other higher order multilinear interpolation, etc. Similarly, a processing pass to be performed by the processing pass circuitry may comprise a filtering pass, such as a bilinear interpolation pass. Bilinear interpolation may be performed as a single bilinear interpolation pass, trilinear interpolation may be performed as a sequence or "chain" of two bilinear interpolation passes, and so on for higher order multilinear interpolation.

A data processing operation may accordingly be performed as, and converted into, a group (sequence or "chain") of one or more related processing passes. For example, a data processing operation that is to be performed as a sequence of processing passes may be performed as, and converted into, a group of "temporally related" processing passes (e.g. in which a later processing pass in the group is dependent on the result of an earlier processing pass in the group). For example, a trilinear filtering operation may be performed as, and converted into, two sequential bilinear processing passes. As will be explained in more detail below, the technology described herein is particularly useful in this situation.

Similarly, a data processing operation may be performed in respect of one or more output data elements (e.g. that correspond to one or more (pixel) sampling positions) of an output array of data elements (e.g. an image, e.g. to be displayed). The one or more output data elements for a data processing operation may comprise a single output data element or (e.g. a block of) plural output data elements (e.g. a "quad" of four (2×2) output data elements). In these embodiments, a data processing operation to be performed in respect of (e.g. a block of) plural output data elements may be performed as, and converted into, a group of "spatially related" processing passes. Again, as will be explained in more detail below, the technology described herein is particularly useful in this situation.

Thus, embodiments may comprise converting a data processing operation into a group (sequence or "chain") of one or more related processing passes. The group of one or more related processing passes may be a group of temporally and/or spatially related processing passes.

Embodiments may further comprise receiving one or more requests for a processing operation to be performed by the processing pass circuitry. One or more such requests may be made during a cycle of operation. A processing request may be made by data (e.g. graphics) processing circuitry of the data (e.g. graphics) processing system. The data processing circuitry may comprise programmable (e.g. graphics) processing circuitry, such as an execution engine or compute engine. The data processing circuitry may implement one or more stages of a data (e.g. graphics) processing pipeline. The data (e.g. graphics) processing pipeline may comprise any desired and suitable stages that a data (e.g. graphics) processing pipeline may comprise. For example, the data processing circuitry may implement a render, such as a fragment shader, e.g. that uses (applies) texture data provided by the processing pass circuitry.

A processing request (i.e. a request for a processing operation to be performed) may be made in respect of one or more output data elements (e.g. that correspond to one or more (pixel) sampling positions) of an output array of data elements (e.g. an image, e.g. to be displayed). As indicated above, the one or more output data elements of the request may comprise a single output data element or (e.g. a block of) plural output data elements (e.g. a "quad" of four (2×2) output data elements). Embodiments may further comprise determining one or more input data elements (e.g. texels) of one or more input arrays of data elements (e.g. textures) that comprise the data used when generating the data for an output data element. The one or more input data elements to be used for an output data element may comprise a single input data element (e.g. for a single lookup) or plural input data elements (e.g. four (2×2) input data elements for bilinear filtering, etc.). The one or more input arrays of data elements (e.g. textures) may be stored in (e.g. main) memory of the data processing system.

Embodiments may further comprise adding one or more processing passes to the record. One or more such processing passes may be added to the record during a cycle of operation. Embodiments may further comprise (e.g. prior to or as a processing pass is being added to the record) determining whether the data that is required for that processing pass is stored in the cache. When the data that is required for the processing pass is not stored in the cache, embodiments may comprise making one or more cache requests for that data to be fetched into the cache (e.g. from memory). Plural cache requests may be made for a processing pass where data for plural input data elements is required. Conversely, when data that is required for the processing pass is already stored in the cache, embodiments may comprise not making a cache request for that data to be fetched into the cache.

In embodiments, a processing pass may be added to the record regardless of whether or not (it was determined that) the data that is required for that processing pass is stored in the cache. In this regard, the Applicants have identified that it can be efficient to store processing passes in the record regardless of whether or not the required data is already stored in the cache, since this can provide a single centralised record of all of the processing passes that need to be performed. Thus, the record may comprise one or more processing passes for which the required data is stored in the cache and/or one or more processing passes for which the required data is not stored in the cache.

The cache may comprise any desired and suitable cache that is local to the processing pass circuitry. For example, the cache and the processing pass circuitry may form part of the same (e.g. graphics) processor. The cache may, for example, comprise a texture cache. The buffer may also comprise any desired and suitable buffer. For example, the buffer may be implemented in random access memory (RAM). The buffer may be configured to store a record of any desired and suitable number of processing passes at any one time. For example, the buffer may be configured to store a record of up to 128 processing passes.

The record of processing passes stored in the buffer can take any desired and suitable form. For example, the record may comprise a set of record indexes for respective processing pass entries in the record, with a given processing pass being assigned to a particular record index. The record may further comprise, for each of the processing passes, a set of one or more indicators for that processing pass. The set of one or more indicators for the processing pass may, for example, comprise one or more of a "scan indicator", a "next indicator", a "tail indicator", a "valid indicator", and a "ready indicator". These indicators will be described in more detail below. The record may further comprise, for each of the processing passes, a set of one or more cache line (or location) addresses for cache lines (or locations) that store or will store the data for that processing pass.

In embodiments, a "payload record" may also be maintained that stores the information (metadata) needed in order to perform the respective processing passes. The information for a particular processing pass may, for example, indicate the particular data and/or parameters that are to be used for that particular processing pass, the particular type of operation that is to be performed for that particular processing pass, etc. The payload record may comprise a set of payload indexes for respective processing pass entries in the payload record, with the information for a given processing pass being assigned to a particular payload index. The payload index for a particular processing pass may correspond to (may be derivable from or may be the same as) the record index for that particular processing pass, such that the record index for the particular processing pass can also be used to obtain the information (metadata) needed in order to perform that processing pass from the payload record. The payload record may be stored in the same buffer or in a different buffer to the record of processing passes.

As discussed above, a subset of one or more of, but not all of, the processing passes in the record are considered or "scanned" in a cycle of operation. The subset of processing passes to be considered in a cycle of operation may comprise any desired and suitable number of processing passes, e.g. any number that is less than the total number of processing passes that can be or are stored in the record. For example, a subset of processing passes to be considered in a cycle of operation may comprise (only) a single processing pass. Thus, (only) a single processing pass may be considered in the first cycle of operation, and (only) a different single processing pass may be considered in the second cycle of operation, and so on. The Applicants have identified that these arrangements can still provide efficient performance in many cases, e.g. where a limited number of processing passes are to be performed each cycle or every few cycles of operation by the data processing circuitry.

A processing pass to be considered in a given cycle of operation may be selected in any desired and suitable way. For example, embodiments may comprise stepping though processing passes in the record, e.g. in a round robin manner, from cycle to cycle. A processing pass to be considered in a cycle of operation may be selected from a group of processing passes that are indicated as needing to be considered or "scanned". Thus, embodiments may comprise stepping though processing passes in the record that can be considered, whilst stepping over processing passes in the record that should not be considered. Embodiments may also or instead comprise stepping though a group (sequence or "chain") of related processing passes in sequence.

A processing pass in the record that can be considered can be identified in any desired and suitable way. For example, in embodiments, a "scan indicator" may be provided in the record for a processing pass that indicates whether or not it can be considered if the required data for that processing pass is stored in the cache. The scan indicator may comprise a bit or flag for the processing pass in question. The scan indicator may be appropriately set for the processing pass when the processing pass is added to the record and/or once the processing pass has been considered (scanned). The scan indicator can then readily be used to determine whether or not it can be considered if the required data for that processing pass is stored in the cache.

Thus, an entry in the record for a processing pass may comprise a scan indicator that indicates whether or not it can be considered if data required when performing that processing pass is stored in the cache. Embodiments may then comprise using a scan indicator for a particular processing pass to determine whether or not it can be considered if the data required for the particular processing pass is stored in the cache. Embodiments may further comprise, when it is determined from the scan indicator that it can be considered if the data required for the particular processing pass is stored in the cache, determining whether the data required when performing the particular processing pass is stored in the cache. Alternatively, when it is determined from the scan indicator not to consider if the data required for the particular processing pass is stored in the cache, embodiments may comprise not determining whether the data required when performing the particular processing pass is stored in the cache.

A processing pass that can be considered in a cycle of operation may comprise any desired and suitable processing pass. For example, a processing pass in the record that can be considered in a cycle of operation may comprise a processing pass for which it has previously been determined that the required data is not stored in the cache (such that it now needs to be determined whether or not the required data has been fetched into the cache). Conversely, the subset of processing passes to be considered in a given cycle of operation may not comprise a processing pass for which it has previously been determined that the required data is stored in the cache (such that it does not need to be determined whether or not the required data has now been fetched into the cache). In this regard, the Applicants have identified that, although it can be beneficial to store a record of processing passes regardless of whether or not the required data for those processing passes is stored in the cache, it can then be inefficient to reconsider processing passes for which it has previously been determined that the required data is stored in the cache.

A processing pass that can be considered in a cycle of operation may also or instead comprise one or more processing passes (e.g. a single processing pass) of a group (sequence or "chain") of related processing passes. Thus, one or more processing passes (e.g. a single processing pass) of a group of related processing passes may be considered in a cycle of operation (e.g. the first cycle of operation). Conversely, one or more other processing passes of the group of related processing passes may not be considered in that cycle of operation (e.g. the first cycle of operation).

Thus, one or more processing passes (e.g. a single processing pass) of a group of related processing passes may have their "scan indicator" set, whereas one or more of the other processing passes of the group of related processing passes may not have their scan indicator set. However, a subset of processing passes to be considered in a subsequent cycle of operation (e.g. the second cycle of operation) may comprise one or more of the other processing passes of the group of related processing passes. Thus, one or more other processing passes of the group of related processing passes may be considered in the subsequent cycle of operation (e.g. the second cycle of operation).

As discussed above, the group (sequence or "chain") of related processing passes may be a group of temporally and/or spatially related processing passes. In this regard, the Applicants have identified that it is often necessary to process a group of plural "temporally related" processing passes in a particular sequence for a data processing operation (e.g. because a later processing pass in the group is dependent on the result of an earlier processing pass in the group). In this case, it can be inefficient to consider a processing pass that is later in the sequence when the data required for a processing pass that is earlier in the sequence has not yet been cached (since the later processing pass cannot not yet be performed even if the data for that later processing pass has been cached). Similarly, the Applicants have identified that some or all of the data required for plural "spatially related" processing passes for a data processing operation is often cached at substantially the same time. In this case, it can be inefficient to consider all of the spatially related processing passes in a particular cycle of operation.

In embodiments, the processing passes of a group (sequence or "chain") of related processing passes may be considered in order, e.g. one processing pass per cycle of operation. For example, the subset of processing passes to be considered in a particular cycle of operation (e.g. the first cycle of operation) may comprise one or more earlier processing passes of a group of related processing passes. Conversely, the subset of processing passes to be considered in the particular cycle of operation (e.g. the first cycle of operation) may not comprise one or more other later processing passes in the group of related processing passes. However, the subset of processing passes to be considered in the subsequent cycle of operation (e.g. the second cycle of operation) may comprise one or more other later processing passes of the group of related processing passes.

A group (sequence or "chain") of related processing passes in the record can be identified in any desired and suitable way. For example, in embodiments, a "next indicator" may be provided that indicates a next (or subsequent) processing pass in the group of related processing passes. The next indicator may indicate the record index in the record for the next processing pass. The next indicator can then readily be used to determine other processing passes in the group of related processing passes. The next indicator may be appropriately set for a given processing pass when that processing pass is added to the record and/or when the next (or subsequent) processing pass is added to the record.

Thus, an entry in the record for a processing pass may comprise a next indicator that indicates the next processing pass in the group of related processing passes. Embodiments may then comprise using the next indicator for a particular processing pass considered in a particular cycle of operation (e.g. the first cycle of operation) to determine the next processing pass in the group of related processing passes to be considered in a subsequent cycle of operation (e.g. the second cycle of operation).

In the case of the final or "tail" processing pass in a group of related processing passes, the next indicator may point to the initial or "head" processing pass in the group. This can allow the initial or "head" processing pass in the group to be readily found. Also, in the case of a group of processing passes that comprises just a single processing pass in the record, the next indicator for the processing pass may point to that processing pass itself. This can indicate that the group of related processing passes comprises only one processing pass.

In embodiments, a "tail indicator" may also be provided in the record that indicates whether or not a processing pass is the last or "tail" processing pass in a group of processing passes. The tail indicator may comprise a bit or flag for the processing pass in question. The tail indicator may be appropriately set for a processing pass when that processing pass is added to the record. This can indicate that the end of the group of related processing passes has been reached.

Embodiments may further comprise providing a "valid indicator" in the record that indicates whether or not that particular record entry is valid and in use. The valid indicator may be appropriately set for a processing pass when that processing pass is added to the record. The valid indicator may be appropriately unset (cleared) for a record entry when the processing pass corresponding to that record entry is output from the record. The valid indicator can then readily be used to determine whether or not that particular record entry is in use.

Determining whether or not data that is required when performing a processing pass is stored in the cache can be performed in any desired and suitable way. For example, in embodiments, a set of one or more cache line (or location) addresses may be provided in the record for the processing pass. The one or more cache line (or location) addresses can then be checked for valid data. In embodiments, a cache status map (e.g. bitmap) may also be provided for the complete set of cache lines (or locations), with the entries (e.g. bits) of the cache status map indicating whether or not the respective cache lines (or locations) contain valid data. Checking the one or more cache line addresses (or locations) for valid data for a processing pass may then comprise checking the one or more cache line addresses (or locations) for the processing pass against the relevant entries of the cache status map.

Embodiments may further comprise outputting one or more processing passes from the record that are ready to be performed. One or more processing passes may be output from the record during a cycle of operation. A processing pass to be output in a cycle of operation may be selected in any desired and suitable way. For example, embodiments may comprise stepping though processing passes in the record, e.g. in a round robin manner, from cycle to cycle. A processing pass to be output in a cycle of operation may be selected from a subset of processing passes that can be output. Thus, embodiments may comprise stepping though processing passes in the record that can be output, whilst stepping over processing passes in the record that should not be output. Embodiments may also or instead comprise stepping though a group (sequence or "chain") of related processing passes in sequence.

A processing pass in the record that can be output can be identified in any desired and suitable way. For example, in embodiments, a "ready indicator" may be provided for a processing pass in the record that indicates whether or not that processing pass is ready to be performed. The ready indicator may comprise a bit or flag for the processing pass in question.

A processing pass may be ready to be performed when (it is determined that) the data that is required for that processing pass (and any other related processing passes in the same group of related processing passes) is stored in the cache. The ready indicator may therefore be appropriately set for a processing pass when the data that is required for that processing pass (and any other related processing passes in the same group of related processing passes) is determined as being stored in the cache. The ready indicator may be appropriately set for the processing pass when the processing pass (and any other related processing passes in the same group of related processing passes) is added to the record and/or when that processing pass (and any other related processing passes in the same group of related processing passes) has been considered (scanned). Thus, embodiments may comprise determining whether the data that is required for a group of related processing passes is stored in the cache and, when it is determined that the data that is required for the group of related processing passes is stored in the cache, setting a ready indicator for one or more processing passes (e.g. the first or "head" processing pass) of the group of related processing passes to indicate that the group of related processing passes is ready to be output from the record and performed.

The ready indicator can then readily be used to determine whether or not a processing pass can be output from the record and performed. Thus, an entry in the record for a processing pass (e.g. the first or "head" processing pass of a group of related processing passes) may comprise a ready indicator that indicates whether or not that processing pass (and any other related processing passes in the same group of related processing passes) is ready to be performed. Embodiments may then comprise using the ready indicator for a particular processing pass (e.g. the first or "head" processing pass of a group of related processing passes) to determine whether or not that processing pass (and any other related processing passes in the same group of related processing passes) can be output from the record and performed.

In embodiments, the processing passes of a group (sequence or "chain") of plural related processing passes may be output contiguously in order, e.g. one processing pass per cycle of operation. In these embodiments, a ready indicator may (only) be provided for the initial or "head" processing pass of the group of plural related processing passes, with the other processing passes of the group of plural related processing passes being identified using a "next indicator" as discussed above, and with the final or "tail" processing pass being identified using a "tail indicator" as discussed above. In these embodiments, an output or "out_chain" indicator may also or instead be used to indicate the next processing pass to be output from the record. The output or "out_chain" indicator may be set using the "next indicator" for the current processing pass being output from the record.

Outputting a processing pass may further comprise deleting that processing pass from the record of processing passes and/or unsetting (clearing) the "valid indicator" for the processing pass in the record of processing passes as discussed above. Outputting a processing pass may further comprise loading the data required for that processing pass from the cache. Outputting a processing pass may further comprise performing that processing pass to generate a result. The result may be combined with, or used to generate, one or more results generated by performing one or more other processing passes in the same group of related processing passes. The result for the processing pass or group of related processing passes may then be provided to the data processing circuitry that requires that result. The result may then be used by the data processing circuitry, e.g. when generating an (e.g. graphics) output. As indicated above, the result may be provided in respect of one or more output data elements (e.g. that correspond to one or more (pixel) sampling positions) of the output array of data elements (e.g. an image, e.g. to be displayed). As discussed above, the one or more output data elements may comprise a single output data element or (e.g. a block of) plural output data elements (e.g. a "quad" of four (2×2) output data elements).

The Applicants have further identified that certain groups of one or more related processing passes may be waiting on data to be fetched into only one or more particular cache lines. These embodiments may further comprise, in addition to providing a record of processing passes, maintaining a cache line (or location) list (e.g. separately from the record) comprising one or more groups of one or more related processing passes that are waiting on data to be fetched into only a particular set of one or more cache lines (or locations). In embodiments, plural such cache line (or location) lists may be maintained for respective sets of one or more cache lines (or locations).

These embodiments may further comprise determining whether a group of one or more related processing passes (e.g. determining whether just the last processing pass of that group) is waiting on data to be fetched into only a particular set of one or more cache lines (or locations) and, when the group of related processing passes (e.g. just the last processing pass of that group) is determined as waiting on data to be fetched into only the particular set of one or more cache lines (or locations), adding the processing passes of that group to the separate cache line (or location) list for particular set of one or more cache lines (or locations). This process of determining whether or not a processing pass can be added to a cache line (or location) list may be performed prior to or as that processing pass or group of processing passes is being added to the record of processing passes.

In these embodiments, when a particular set of one or more cache lines (or locations) have been fetched into the cache, all the data required for the one or more groups of one or more processing passes on the cache line (or location) list for that particular set of one or more cache lines (or locations) will be stored in the cache. These embodiments may therefore further comprise determining that the data for a particular set of one or more cache lines (or locations) has been fetched into the cache and, responsive to determining that the data for the particular set of one or more cache lines (or locations) has been fetched into the cache, indicating that the one or more groups listed in the cache line (or location) list for the particular set of one or more cache lines (or locations) are ready to be output from the record and performed (e.g. using one or more "ready indicators" as discussed above). These embodiments can provide an efficient way to identify certain groups of one or more related processing passes that are ready to be performed by considering the cache lines (or locations) that are fetched, e.g. rather than considering the processing passes individually.

Since the processing passes of the listed one or more groups can be handled separately, these embodiments may also comprise indicating (e.g. using one or more "scan indicators" as discussed above) that the processing passes of the listed one or more groups do not need to be scanned. The groups of one or more related processing passes in a cache line (or location) list may also be linked together, e.g. with the last or "tail" processing pass in one group pointing to the first or "head" processing pass of another group, and so on. These embodiments can allow the groups of one or more related processing passes in the separate cache line (or location) list to be output from the record, e.g. contiguously, in order. In these embodiments, the first or "head" processing pass of the first group of the linked groups may be the only processing pass that is indicated as being a "head" processing pass (e.g. using a "head indicator"). In these embodiments, the last or "tail" processing pass of the last group of the linked groups may be the only processing pass that is indicated as being a "tail" processing pass (e.g. using a "tail indicator"). This can indicate that the end of the linked groups of one or more related processing passes has been reached.

The Applicants have further identified that there may be situations where the record of processing passes needs to be at least partially emptied or "drained", e.g. without making use of the "ready indicator" in the record of processing passes in the manner as discussed above. For example, the record may need to be drained when the record is full or substantially full. The record may also or instead need to be drained when no cache lines (or locations) are available for allocating to new cache requests. These situations may arise, for example, where the record comprise a (very large) single incomplete group of related processing passes, e.g. having no last or "tail" processing pass. In these embodiments, draining the record may comprise considering and outputting one or more processing passes from the record at a time, before moving on to considering and outputting the next one or more processing passes, and so on, e.g. in the manner of a FIFO.

Embodiments may therefore comprise determining that the record needs to be drained of processing passes, and responsive to determining that the record needs to be drained of processing passes, switching to a (e.g. FIFO) mode of operation in which the record is drained of processing passes. Embodiments may further comprise, responsive to determining that the record no longer needs to be drained of processing passes, switching back to operating in a (non-FIFO) mode of operation, e.g. that uses "ready indicators", as discussed above. For example, embodiments may comprise determining that the record of processing passes comprises a single incomplete group of related processing passes (and, e.g., that no further cache lines (or locations) are available for allocating to new cache requests) and, responsive to determining that the record of processing passes comprises a single incomplete group of related processing passes (and, e.g., that no further cache lines (or locations) are available for allocating to new cache requests), switching to a (FIFO) mode of operation in which processing passes of the single incomplete group of related processing passes are output from the record and performed. Embodiments may further comprise determining that a last or "tail" processing pass of a group of related processing passes has been output and performed and, responsive to determining that a last or "tail" processing pass of a group of related processing passes has been output and performed, switching to a (non-FIFO) mode of operation, e.g. that uses "ready indicators", as discussed above. It should be noted here that one or more processing passes may still be added to the record and/or considered (scanned) whilst the record of processing passes is being drained.

As will be appreciated, although first and second cycles of operation have primarily been referred to above, operation in the manner of the present technology may continue in substantially the same manner for one or more further cycles of operation, for example until all or substantially all of the desired processing passes have been output and performed. In these embodiments, in a given cycle of operation, one or more requests (e.g. a single request) may be received for a data processing operation to be performed, one or more processing passes (e.g. a single processing pass) may be added to the record of processing passes, one or more processing passes (e.g. a single processing pass) in the record may be considered (scanned), and/or one or more processing passes (e.g. a single processing pass) may be output from the record and performed, in a manner as discussed above.

The technology described herein can be used for all forms of output that a data (e.g. graphics) processing system may be used to generate, such as frames for display, render-to-texture outputs, etc. The output, e.g. fragment shaded, data values from the data (e.g. graphics) processing may exported to external, e.g. main, memory, for storage and use, such as to a frame buffer for a display.

The technology described herein is applicable to any suitable form or configuration of data (e.g. graphics) processor. It is particularly applicable to tile-based graphics processors and graphics processing systems. Thus in an embodiment, the data processing system is a tile-based graphics processing system.

In an embodiment, the data (e.g. graphics) processing system comprises, and/or is in communication with, one or more memories and/or memory devices that store the data described herein, and/or that store software for performing the processes described herein. The data (e.g. graphics) processing system may also be in communication with a host microprocessor, and/or with a display for displaying images based on the output of the data (e.g. graphics) processing system.

The technology described herein can be implemented in any suitable data processing system that uses caches, such as a suitably configured micro-processor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the data processing system can otherwise include any one or more or all of the usual functional units, etc., that data (e.g. graphics) processing systems include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, embodiments the technology described may comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a (e.g. graphics) processor, renderer or microprocessor system comprising a data processor causes, in conjunction with said data processor, said (e.g. graphics) processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from embodiments the technology described herein may comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

As discussed above, the technology described herein relates to the handling of plural processing passes, where the data to be used in those passes is to be cached. An embodiment of the technology described herein will now be described with reference to the fetching and use of texture data in a graphics processing system.

When a computer graphics image is to be displayed, it is usually first defined as a series of primitives (polygons), which primitives are then divided (rasterised) into graphics fragments for graphics rendering in turn. During a graphics rendering operation, the renderer will modify the (e.g.) colour (red, green and blue, RGB) and transparency (alpha, a) data associated with each fragment so that the fragments can be, e.g., displayed correctly. Once the fragments have fully traversed the renderer, then their associated data values are stored in memory, ready for output, e.g. for display.

FIG. 1 shows schematically a graphics processing system 100 comprising a graphics processing pipeline that may be operated in accordance with the technology described herein.

FIG. 1 shows the main elements and pipeline stages of the graphics processing pipeline and graphics processing system 100 that are relevant to the operation of the present embodiment. As will be appreciated by those skilled in the art there may be other elements of the graphics processing system 100 that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing system 100 as shown in FIG. 1 may be implemented as desired and will accordingly comprise, e.g., appropriate circuitry and/or processing logic, etc., for performing the necessary operation and functions.

The graphics processing system 100 shown in FIG. 1 is a tile-based system. The graphics processing pipeline will thus produce tiles of a render output data array, such as an output frame, to be generated. The technology described herein is equally applicable to other systems, such as immediate mode rendering systems. The output data array may typically be an output frame intended for display on a display device, such as a screen or printer, but may also, for example, comprise a "render to texture" output of the graphics processor, etc.

FIG. 1 shows schematically the pipeline stages after the graphics primitives (polygons) for input to the rasterisation process have been generated. Thus, at this point the graphics data (the vertex data) has undergone transformation and lighting operations (not shown), and a primitive set-up stage (not shown) has set-up the primitives to be rendered in response to the commands and vertex data provided to the graphics processing pipeline.

As shown in FIG. 1, this part of the graphics processing pipeline includes a rasteriser 102 and a rendering stage (renderer) in the form of a fragment shading stage (fragment shader) 104. The pipeline also includes and/or has access to (is in communication with) appropriate memory 106 for storing the data that the pipeline will use and/or generate, such as a depth and stencil buffer(s), tile buffers, a frame buffer 108, texture maps 110, etc.

The rasteriser 102 operates to rasterise the primitives making up the render output (e.g. the image to be displayed) into individual graphics fragments for processing. To do this, the rasteriser 102 receives graphics primitives to be rendered, rasterises the primitives to sampling points and generates graphics fragments having appropriate positions (representing appropriate sampling positions) for rendering the primitives.

Fragments generated by the rasteriser 102 are sent onwards to the fragment shading stage 104 (the renderer), as shown in FIG. 1. The fragments may be subjected to early culling tests, such as depth tests, before being sent to the fragment shader 104, if desired.

The fragment shading stage 104 performs the appropriate fragment processing (rendering) operations on the fragments it receives, so as to process the fragments to generate the appropriate rendered fragment data, etc., for the render output (e.g. for display of the fragments).

This fragment processing may include any suitable and desired fragment shading processes, such as executing fragment shader programs on the fragments, applying textures to the fragments, applying blending, fogging or other operations to the fragments, etc., to generate the appropriate fragment data.

In the present embodiment, the fragment shading stage 104 is in the form of a shader pipeline (a programmable fragment shader) implemented by an execution engine 112, but other arrangements, such as the use also or instead of fixed function fragment shading units would be possible, if desired.

The output fragment data values (the result colours) are written to appropriate tile buffers (not shown) that store an appropriate, e.g. colour, value for each sampling point that the buffers represent (in essence for each sampling point of the tile that is being processed). Once each tile has been processed, its data is exported from the tile buffers to a frame buffer 108 in a main memory 106 for storage, and the next tile is then processed, and so on, until sufficient tiles have been processed to generate the entire render output (e.g. frame (image) to be displayed).

The fragments may be subjected to any remaining operations necessary on the fragments, such as depth and stencil tests, blending with the framebuffer, dither, etc. (not shown), before being written to the tile and/or frame buffers, if desired.

Other arrangements for the graphics processing pipeline would, of course, be possible.

As shown in FIG. 1, as part of its operation the fragment shader 104 will use textures when shading the fragments it receives from the rasteriser 102, and as part of that texturing process will apply texture sample data (texels) using a texture mapper 114 of the graphics processing system 100.

Figure 2:
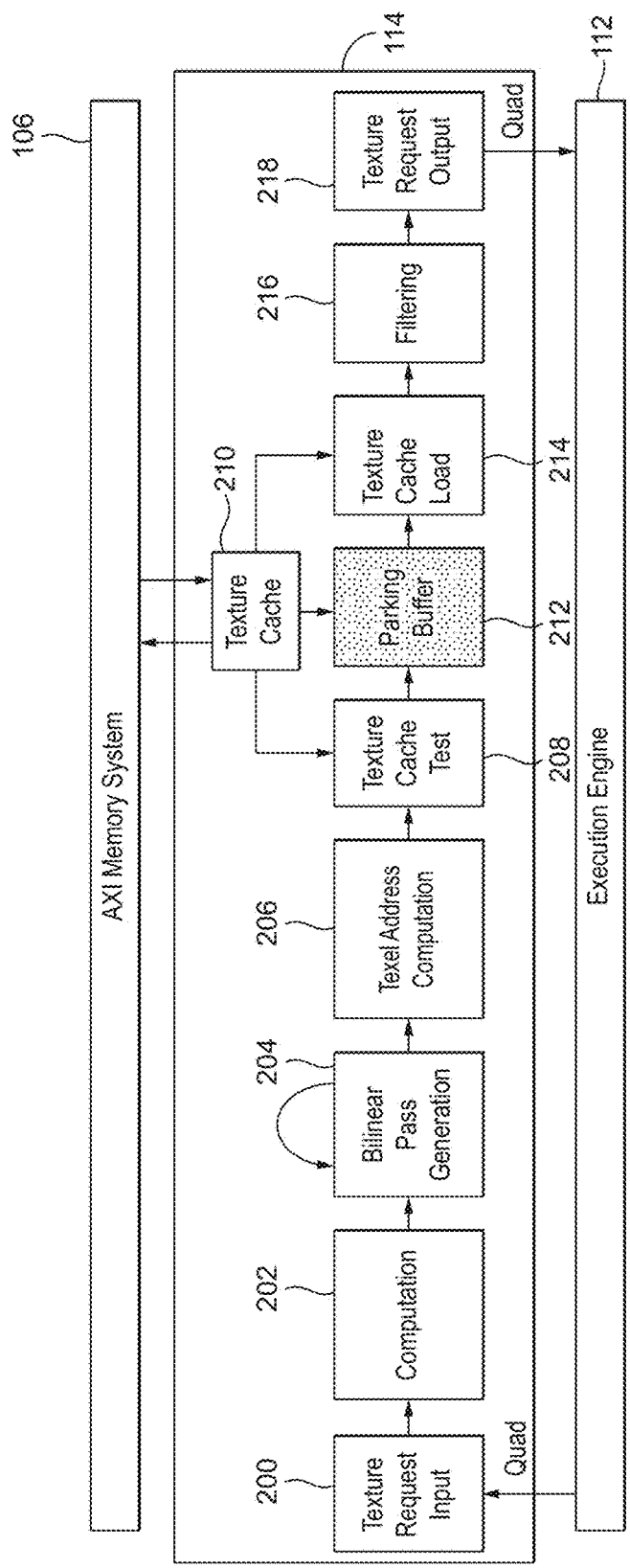
FIG. 2 shows schematically a texture mapper according to an embodiment of the present technology.

FIG. 2 shows the operation of the texture mapper 114 in more detail. Also shown are the memory 106 and execution engine 112. As is shown in FIG. 2, the texture mapper 114 comprises a texture request input stage 200 that receives a texture request for a texture processing operation to be performed from the execution engine 112 through a GPU interconnect. In this embodiment, the texture request relates to a "quad" fragment for 2×2 sampling positions.

The texture mapper 114 then comprises a computation stage 202 that decodes the texture request for the quad. The decoded texture request is then converted by a bilinear pass generation stage 204 into a group (sequence or "chain") of one or more bilinear filtering passes. In this embodiment, the texture operation to be performed comprises bilinear filtering and so the texture operation for the quad will be formed of a group (sequence or "chain") of four bilinear filtering passes, with each bilinear filtering pass generating data for one of the sampling positions of the quad. In this embodiment, each bilinear filtering pass for a sampling position of the quad uses texture data for a 2×2 block of four texels.

Figure 3:
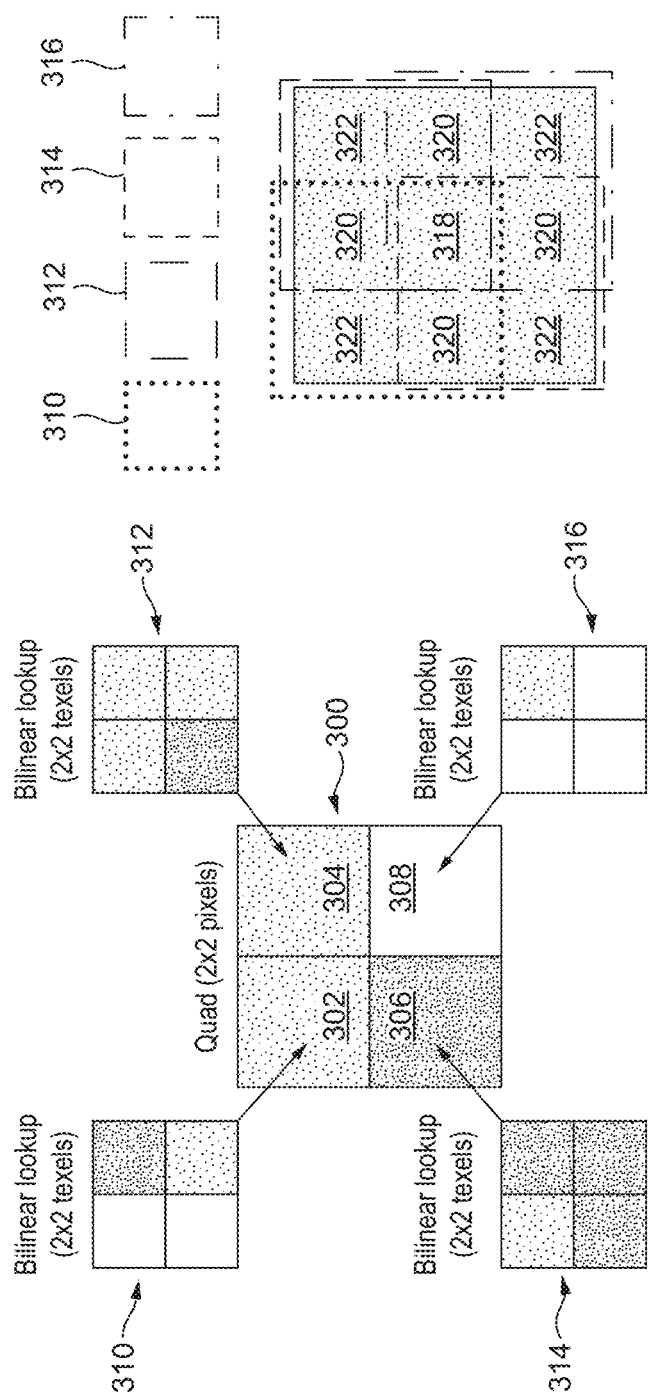
FIG. 3 illustrates a relationship between sampling positions and texels according to an embodiment of the present technology.

The relationship between the sampling positions of the quad and the texels of the texture in the present embodiment is shown in more detail in FIG. 3. As is shown in FIG. 3, a quad 300 relates to four sampling positions 302, 304, 306, 308. A first sampling position 302 of the quad will use a first 2×2 block of four texels 310, a second sampling position 304 of the quad will use a second 2×2 block of four texels 312, a third sampling position 306 of the quad will use a third 2×2 block of four texels 314, and a fourth sampling position 308 of the quad will use a fourth 2×2 block of four texels 316. Thus, in total, sixteen texels worth of data are needed.

However, FIG. 3 also shows how the blocks of texels overlap in the texture being applied. As is shown in FIG. 3, the central texel 318 of a 3×3 block of texels forms part of all four 2×2 blocks of texels, the four centre-edge texels 320 each form part of respective pairs of 2×2 blocks, and the four corner-edge texels 322 each form part of respective single 2×2 blocks. Thus, in this embodiment, for a quad of four sampling positions, with each sampling position using texture data from four texels, data is only required for nine unique texels (rather than sixteen unique texels). Since the processing passes for the quad share at least some texel data, it is desirable to try to handle those processing passes collectively as a group of related processing passes where possible. The present technology is particularly useful in this regard.

In the present embodiment, the texture operation to be performed comprises bilinear filtering. However, other higher order multilinear filtering may be performed in other embodiments. For example, trilinear filtering may be performed as two bilinear filtering passes for each sampling position of the quad, giving a group (sequence or "chain") of eight bilinear filtering passes for the quad. In these other embodiments, since the bilinear processing passes that form a trilinear filtering operation for a given sampling position are dependent on one another and must be performed in the correct order, it is desirable to try to handle those bilinear processing passes collectively as a group of related processing passes where possible. Again, the present technology is particularly useful in this regard.

Referring again to FIG. 2, the cache line (or location) addresses for the texels to be used in the bilinear filtering passes are then calculated by a texel address computation stage 206. A texture cache test stage 208 then determines whether or not the texture data for those texels is already stored in a local texture cache 210. For example, the required texture data may already have been fetched for a different bilinear filtering pass.

If the texture data to be used in a bilinear filtering pass is not already stored in the texture cache 210, then a request is made to fetch the required texture data into the texture cache 210 from the memory 106. A single cache request or plural cache requests (up to four cache requests in this embodiment) may be made for a given processing pass. If the texture data to be used in the bilinear filtering pass is already stored in the texture cache 210, then no such requests need to be made. (It should be noted here that there may be more than one level of cache, so more than one level of cache request may be needed, depending on the number of cache misses at different levels of cache.)

Regardless of whether or not the texture data to be used in the bilinear filtering pass is already stored in the cache 210, a record of the bilinear filtering pass is then added to a parking buffer 212. The operation of the parking buffer 212 is controlled using buffer management circuitry and will be described in more detail below.

In the present embodiment, a reference counter is also maintained in respect of each of the cache lines. In this regard, when a processing pass is added to the parking buffer 212, the reference counter for the relevant cache line is incremented. When a processing pass is later output from the parking buffer 212, the reference counter for the relevant cache line is decremented. This means that the reference counter for a particular cache line indicates the number of processing passes that are waiting to use the data in that cache line. A cache line is "locked" and cannot be reallocated to a different set of data when its reference counter is non-zero, i.e. when there are processing passes that are waiting to use the data in that cache line. However, a cache line is "unlocked" and can be reallocated to a different set of data when the reference counter for that cache line reaches zero, i.e. when there are no processing passes that are waiting to use the data in that cache line. This provides a convenient way to keep track of which cache lines are in use and which cache lines can be reallocated.

Figure 4:
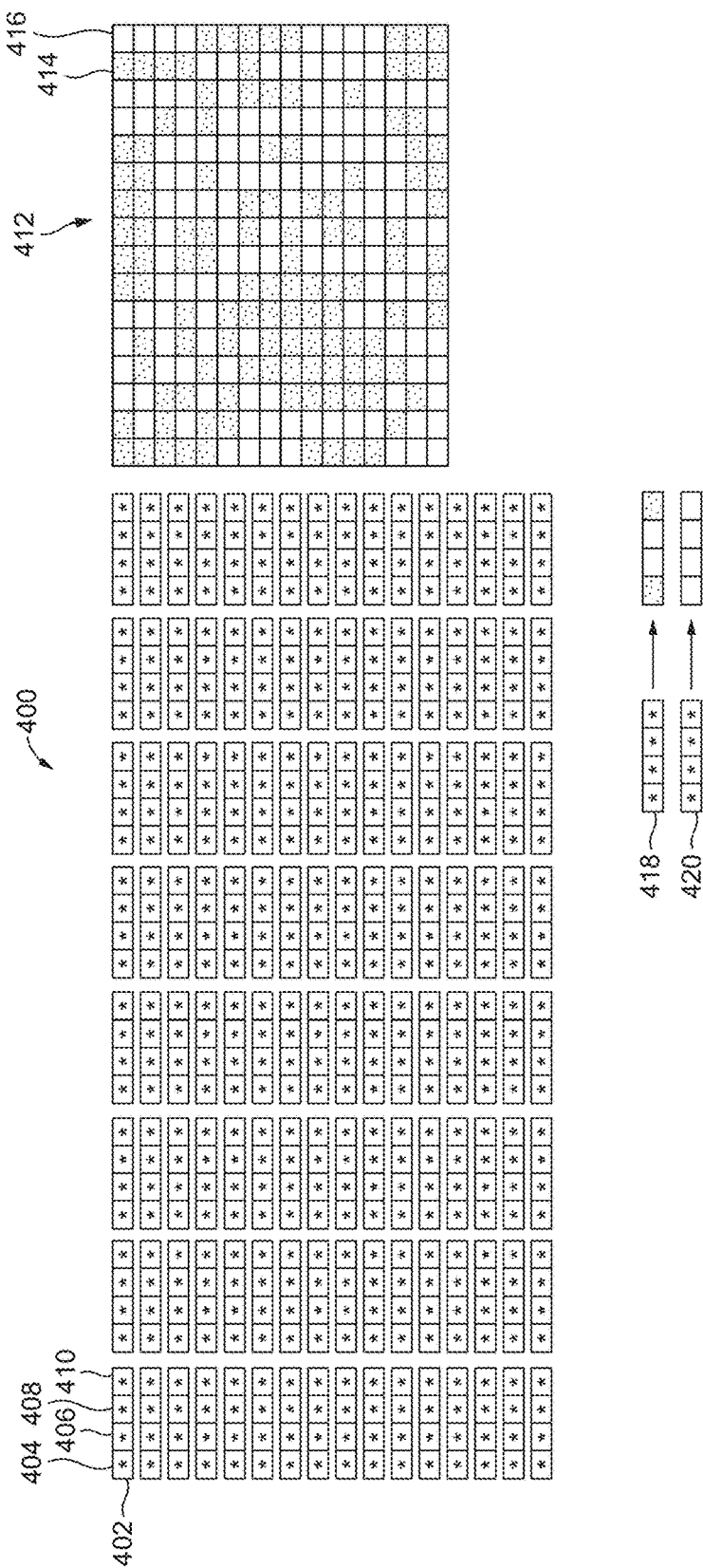
FIG. 4 shows cache line addresses for plural graphics texture processing passes together with a bitmap indicating cache lines that contain valid data according to an embodiment of the present technology.

An example of a set of processing passes that can be recorded in the parking buffer 212 are shown in more detail in FIG. 4. As is shown in FIG. 4, in this embodiment, the parking buffer can store a set 400 of up to 128 processing passes 402, with each processing pass using up to four cache line addresses 404, 406, 408, 410 for its data. A given processing passes may use up to four different cache line addresses for its cache requests or may use at least some cache line addresses that are the same.

FIG. 4 also shows a cache status bitmap 412 that shows which cache lines contain valid data. In this embodiment, there are 256 cache lines available for allocating to cache requests. In FIG. 4, an entry in the bitmap 412 that is darker indicates that the cache line (or location) does not contain valid data, whereas an entry in the bitmap 412 that is lighter indicates that the cache line does contain valid data. For example, the entry 414 for one cache line indicates that that cache line does not contain valid data, whereas the entry 416 for another cache line indicates that that cache line does contain valid data. The cache line addresses 404, 406, 408, 410 and cache status bitmap 412 can accordingly be used to determine when a processing pass is ready to be performed.

FIG. 4 also illustrates, as an example, a first processing pass 418 for which two of its cache line addresses point to cache lines having valid data but two of its cache line addresses point to cache lines that do not have valid data. This first processing pass 418 accordingly is not ready to be performed. FIG. 4 also illustrates, as an example, another processing pass 420 for which all of its cache line addresses point to cache lines having valid data. This other processing pass 420 accordingly is ready to be performed. As will be discussed in more detail below, the operation of the parking buffer in the manner of the present technology provides an efficient way of determining which processing passes are ready to be performed.

Referring again to FIG. 2, when all of the texture data to be used in the bilinear filtering passes for the quad has been fetched into the texture cache 210, the bilinear filtering passes for the quad are output from the parking buffer 212 and the required data is loaded from the texture cache 210 by a texture cache load stage 214. The bilinear filtering passes for the quad are then performed by a filtering stage 216. The result of the filtering for the quad is then output by a texture request output stage 218 through the GPU interconnect to the execution engine 112.

As will be appreciated, the above process will performed in respect of each quad for which a texture processing operation request is made and for each processing pass for each requested texture processing operation.

Figure 5:
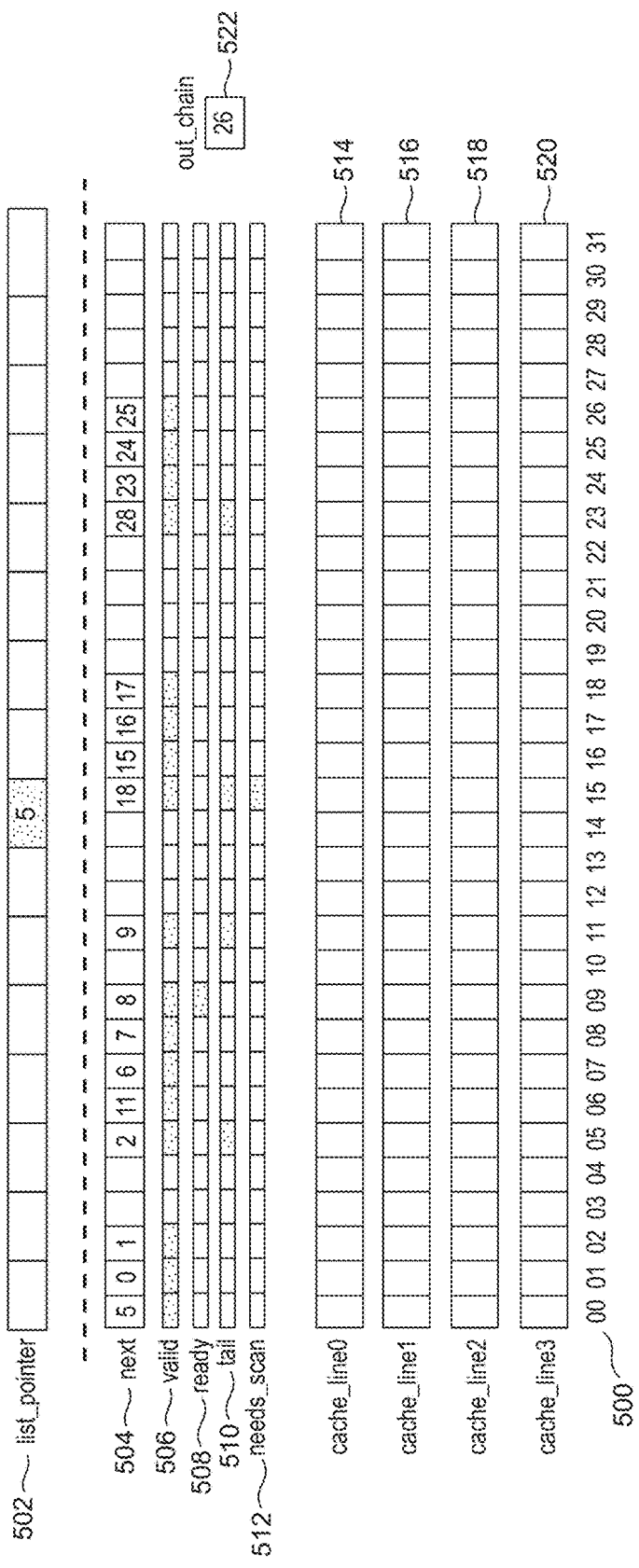
FIG. 5 shows a record of texture processing passes according to an embodiment of the present technology.

FIG. 5 shows in more detail the contents of the record of processing passes stored in a parking buffer. In the embodiment of FIG. 5, the buffer can store a record of up to 32 processing passes. However, as discussed above, in other embodiments, the parking buffer may be able to record many more processing passes than this, such as 128 processing passes.

In this embodiment, the processing passes are referenced using 32 record indexes 500 (00 to 31). In this embodiment, the record of processing passes comprises a "next indicator" 504 for each processing pass that points to the next processing pass in a group (sequence or "chain") of related processing passes. In the case of the last or "tail" processing pass in a group of related processing passes, the next indicator 504 will point back to the initial or "head" processing pass in the group. In the case of a group of just a single processing pass, the next indicator 504 will point back to that single processing pass itself. The record of processing passes further comprises a "valid indicator" 506 for each processing pass that indicates whether or not that entry of the record is in use. The record of processing passes further comprises a "ready indicator" 508 for each processing pass that indicates whether or not that processing pass is the initial or "head" processing pass of a group of related processing passes that are ready for processing. The record of processing passes further comprises a "tail indicator" 510 for each processing pass that indicates whether or not that processing pass is the last or "tail" processing pass in a group of related processing passes. The record of processing passes further comprises a "scan indicator" 512 for each processing pass that indicates whether or not that processing pass can be considered or "scanned" during a cycle of operation.

As discussed above, in this embodiment, each processing pass uses up to four cache addresses for the data required when performing that processing pass. FIG. 5 therefore also shows four sets of cache addresses 514, 516, 518, 520 for recording up to four cache addresses for each of the processing passes in the record.

A payload record (not shown) is also kept for the processing passes. The payload record provides the information (metadata) needed when performing the processing passes. The information for a particular processing pass can be obtained from the payload record using the record index for that particular processing pass.

In the example shown in FIG. 5, there are four groups of related processing passes stored in the record. These groups of related processing passes will now be discussed in more detail.

The processing passes of a first group of related processing passes are respectively referenced by record indexes 00, 01, 02 and 05. The processing pass referenced at record index 02 is the initial or "head" processing pass in the first group. The record for processing pass 02 then indicates that the processing pass referenced at record index 01 is the next processing pass in the first group. The record for processing pass 01 then indicates that the processing pass referenced at record index 00 is the next processing pass in the first group. The record for processing pass 00 then indicates that the processing pass referenced at record index 05 is the next processing pass in the first group. The record for processing pass 05 then indicates that the processing pass referenced at record index 02 is the next processing pass in the first group. However, the tail indicator 510 for processing pass 05 also indicates that processing pass 05 is the last or "tail" processing pass in the first group. Thus, it can be concluded that processing pass 02 is the initial or "head" processing pass in the first group.

In the case of this first group, none of the scan indicators 512 for the processing passes are set. Thus, there is no need to determine whether the data for any of the processing passes of the first group have been fetched into the cache. In this case, this is because the first group of processing passes are listed in a separate cache line list that comprises processing passes that are waiting on data for only one particular cache line. When that particular cache line is fetched, all of the processing passes in that cache line list are determined as being ready to be performed. As is shown in FIG. 5, a list pointer 502 points to the last processing pass that was stored in the separate cache line list. In the example shown in FIG. 5, the last processing pass to be stored in the separate cache line list was the processing pass referenced by record index 05. The operation of the separate cache line list is discussed in more detail below with reference to FIG. 9. As is also shown in FIG. 5, none of the ready indicators 508 for the processing passes of the first group are set. This is because the particular cache line for the separate cache line list has not yet been fetched. Thus, it can readily be determined from the ready indicators 508 that the processing passes of the first group of processing passes are not ready to be output from the buffer.

The processing passes of a second group of related processing passes are respectively referenced by record indexes 06, 07, 08, 09 and 11. The processing pass referenced at record index 09 is the initial or "head" processing pass in the second group. The record for processing pass 09 then indicates that the processing pass referenced at record index 08 is the next processing pass in the second group. The record for processing pass 08 then indicates that the processing pass referenced at record index 07 is the next processing pass in the group second group. The record for processing pass 07 then indicates that the processing pass referenced at record index 06 is the next processing pass in the second group. The record for processing pass 06 then indicates that the processing pass referenced at record index 11 is the next processing pass in the second group. The record for processing pass 11 then indicates that the processing pass referenced at record index 09 is the next processing pass in the second group. However, the tail indicator 510 for processing pass 11 indicates that processing pass 11 is the last or "tail" processing pass in the second group. Thus, it can be concluded that processing pass 09 is the initial or "head" processing pass in the second group.

In the case of this second group, the ready indicator 508 for the processing pass 09 is set. Thus, it can readily be determined from this ready indicator 508 that all of the data for the processing passes of the second group of processing passes has been fetched into the cache and that the processing passes of the second group of processing passes are ready to be output from the record.

The processing passes of a third group of related processing passes are respectively referenced by record indexes 15, 16, 17, 18. The processing pass referenced at record index 18 is the initial or "head" processing pass in the third group. The record for processing pass 18 then indicates that the processing pass referenced at record index 17 is the next processing pass in the third group. The record for processing pass 17 then indicates that the processing pass referenced at record index 16 is the next processing pass in the third group. The record for processing pass 16 then indicates that the processing pass referenced at record index 15 is the next processing pass in the third group. The record for processing pass 15 then indicates that the processing pass referenced at record index 18 is the next processing pass in the third group. However, the tail indicator 510 for processing pass 15 indicates that processing pass 15 is the last or "tail" processing pass in the third group. Thus, it can be concluded that processing pass 18 is the initial or "head" processing pass in the third group.

In the case of this third group, the scan indicator 512 for the last or "tail" processing pass 15 is set. This indicates that it has not yet been determined that all of the data for the processing passes of the third group has been fetched into the cache and that such a determination needs to be made in respect of the last or "tail" processing pass 15 before the processing passes of the third group can be considered ready to be output from the record. Accordingly, none of the ready indicators 508 for the processing passes of the third group are set. Thus, it can also readily be determined from the ready indicators 508 that the processing passes of the third group are not ready to be output from the buffer.

The processing passes of a fourth group of related processing passes are respectively referenced by record indexes 23, 24, 25, 26, and 28, at least. The processing pass referenced at record index 28 is the initial or "head" processing pass in the fourth group. However, that processing pass has already been output from the record, possibly together with other processing passes in the same group. As is indicated by an out_chain indicator 522, the processing pass referenced at record index 26 is the next processing pass in the fourth group, and thus should be the next processing pass to be output. The record for processing pass 26 then indicates that the processing pass referenced at record index 25 is the next processing pass in the fourth group, and thus should be the next processing pass to be output. The record for processing pass 25 then indicates that the processing pass referenced at record index 24 is the next processing pass in the fourth group, and thus should be the next processing pass to be output. The record for processing pass 24 then indicates that the processing pass referenced at record index 23 is the next processing pass in the fourth group, and thus should be the next processing pass to be output. The record for processing pass 23 then indicates that the processing pass referenced at record index 28 is the next processing pass in the fourth group. However, the tail indicator 510 for processing pass 23 indicates that processing pass 23 is the last or "tail" processing pass in the fourth group. Thus, it can be concluded that processing pass 28 is the initial or "head" processing pass in the fourth group.

In the case of this fourth group, none of the scan indicators 512 for the processing passes are set. Thus, there is no need to determine whether the data for the processing passes of the fourth group has been fetched into the cache. Also, none of the ready indicators 508 for the processing passes of the fourth group are set. In this case, this is because the processing passes of the fourth group are already in the process of being output, as indicated by the out_chain indicator 522.

In the embodiment of FIG. 5, since only the processing pass referenced at record index 15 needs to be scanned (and this is indicated with the scan indicator 512 for that processing pass), the amount of processing resources needed during a cycle of operation to consider which processing passes in the record are now ready to be performed is significantly reduced, e.g. compared to arrangements in which all of the processing passes in the record are considered during each cycle of operation.

Figure 6:
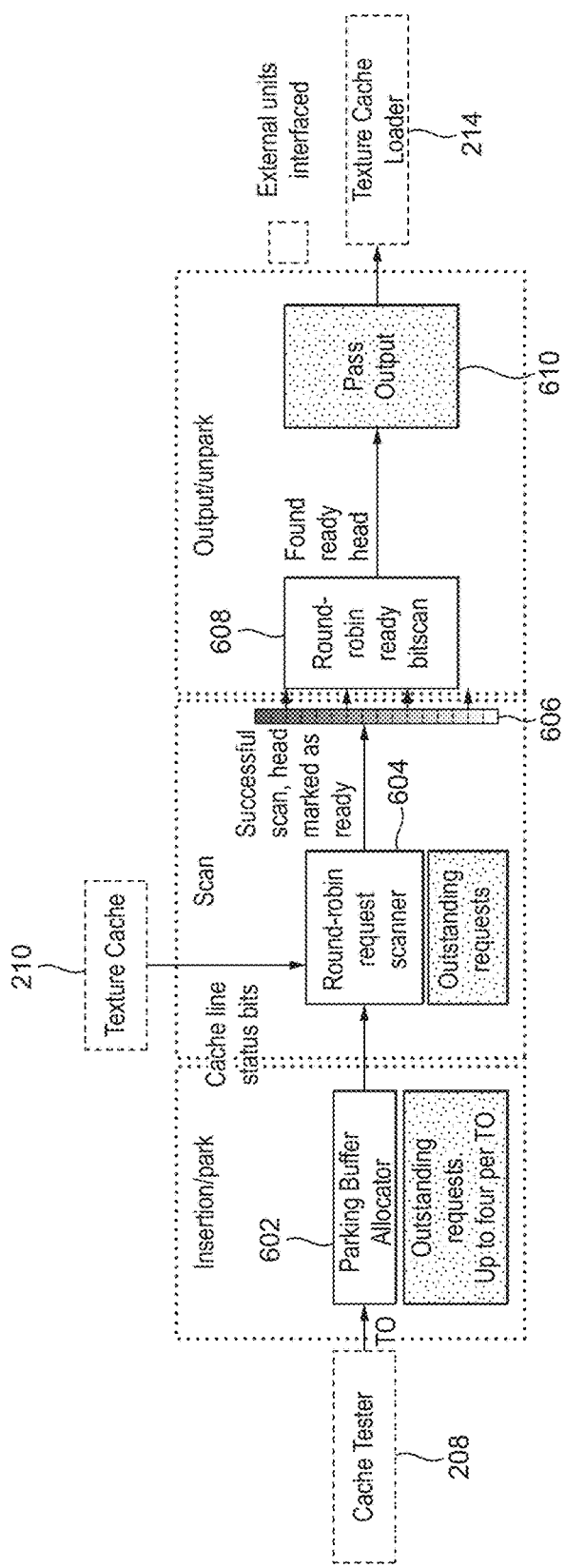
FIG. 6 illustrates buffer management circuitry according to an embodiment of the present technology.

FIG. 6 shows an overview of managing the record of processing passes stored in the parking buffer using buffer management circuitry. In this embodiment, as discussed above, in a given cycle of operation, a texture cache test stage 208 receives a processing pass and tests whether or not the texture data required for that processing pass is already stored in the texture cache 210. As discussed above, if the required data is not stored in the texture cache 210, a request is made to fetch that data into the texture cache 210. As discussed above, in this embodiment, since each processing pass can require four texels of data, there can be up to four outstanding cache requests for a given processing pass. It should be noted here that the outstanding cache requests are managed separately from the record of processing passes and may, for example, be managed in a conventional manner.

The processing pass is then stored in the parking buffer by a parking buffer allocator 602. The operation of the parking buffer allocator 602 will be discussed in more detail below. In the same cycle of operation, a round robin request scanner 604 selects a processing pass from the parking buffer to be considered (that has its scan indicator set) and determines whether the data required for that processing pass is stored in the texture cache 210. Again, the operation of the round robin request scanner 604 will be discussed in more detail below. In the same cycle of operation, a round robin ready bitscanner 608 identifies a processing pass from the record 606 that is ready to be performed (that has its ready indicator set) and that processing pass is then output by a pass output stage 610 to the texture cache loader 214. Again, the operation of the round robin ready bitscanner 608 will be discussed in more detail below. In this embodiment, the parking buffer allocator 602, round robin request scanner 604, round robin ready bitscanner 608 and pass output stage 610 together constitute the buffer management circuitry referred to herein.

The above process is then repeated for each one of plural subsequent cycles of operation, but with the parking buffer allocator 602 adding a new processing pass to the record, the round robin request scanner 604 selecting a new processing pass to consider from the record, and the round robin ready bit scanner 608 outputting a new processing pass that is ready to be performed from the record. The texture cache loader 214 also loads the data required for each output processing pass from the texture cache 210 so that that processing pass can then be performed.

Figure 7:
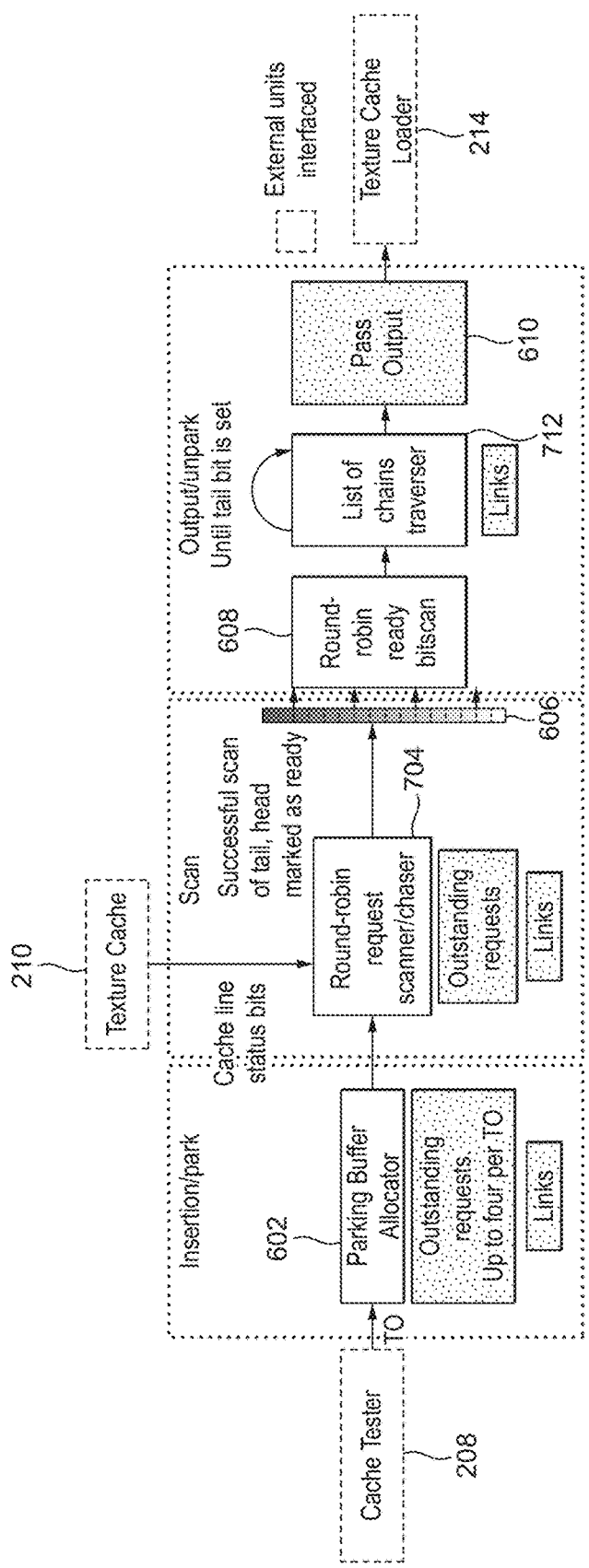
FIG. 7 illustrates buffer management circuitry according to another embodiment of the present technology.

FIG. 7 shows another overview of managing the record of processing passes stored in the parking buffer using buffer management circuitry. In this embodiment, as discussed above, in a given cycle of operation, a texture cache test stage 208 receives a processing pass and tests whether or not the texture data required for that processing pass is already stored in the texture cache 210. As discussed above, if the required data is not stored in the texture cache 210, a request is made to fetch that data into the texture cache 210. As discussed above, since each processing pass can require four texels of data, there can be up to four outstanding requests for a given processing pass. It should again be noted here that the outstanding cache requests are managed separately from the record of processing passes and may, for example, be managed in a conventional manner.

The processing pass is then stored in the parking buffer by a parking buffer allocator 602. Again, the operation of the parking buffer allocator 602 will be discussed in more detail below. In the same cycle of operation, a round robin request scanner/chaser 704 selects a processing pass from the parking buffer to be considered (that has its scan indicator set) and determines whether the data required for that processing pass is stored in the texture cache 210. In this embodiment, the selected processing pass may be an initial or "head" processing pass in a group (sequence or "chain") of plural processing passes, or may be the next processing pass to be considered in a group (sequence or "chain") of plural processing passes. As discussed above, the next processing pass in a group to be considered may be indicated in the record by an index stored in association with the previous processing pass in the group. Again, the operation of the round robin request scanner/chaser 704 will be discussed in more detail below. In the same cycle of operation, a round robin ready bitscanner 608 may identify from the record 706 an initial or "head" processing pass of a group of processing passes that is ready to be performed. Again, the operation of the round robin ready bitscanner 608 will be discussed in more detail below. The initial or "head" processing pass is then provided to a list of chains traverser 712. The list of chains traverser 712 provides, in respective cycles of operation, each of the processing passes in the group to which the initial or "head" processing pass belongs to a pass output stage 610, which then outputs those processing passes to the texture cache loader 214. As discussed above, the next processing pass in a group to be output may be indicated by an out_chain indicator 522. This allows a group of related processing passes to be output and performed contiguously in the correct order once the data required for the whole group is stored in the cache. In this embodiment, the parking buffer allocator 602, round robin request scanner/chaser 704, round robin ready bitscanner 608, list of chains traverser 712, and pass output stage 610 together constitute the buffer management circuitry referred to herein.

The above process is then repeated for each one of plural subsequent cycles of operation, but with the parking buffer allocator 602 adding a new processing pass to the record, the round robin request scanner/chaser 704 selecting a new processing pass to consider from the record (either by selecting the initial or "head" processing pass in a new group or the next processing pass in the current group), and the round robin ready bit scanner 608 or list of chains traverser 712 outputting a new processing pass that is ready to be performed from the record. The texture cache loader 214 also loads the data required for each output processing pass from the texture cache 210 so that that processing passes can then be performed.

Figure 8:
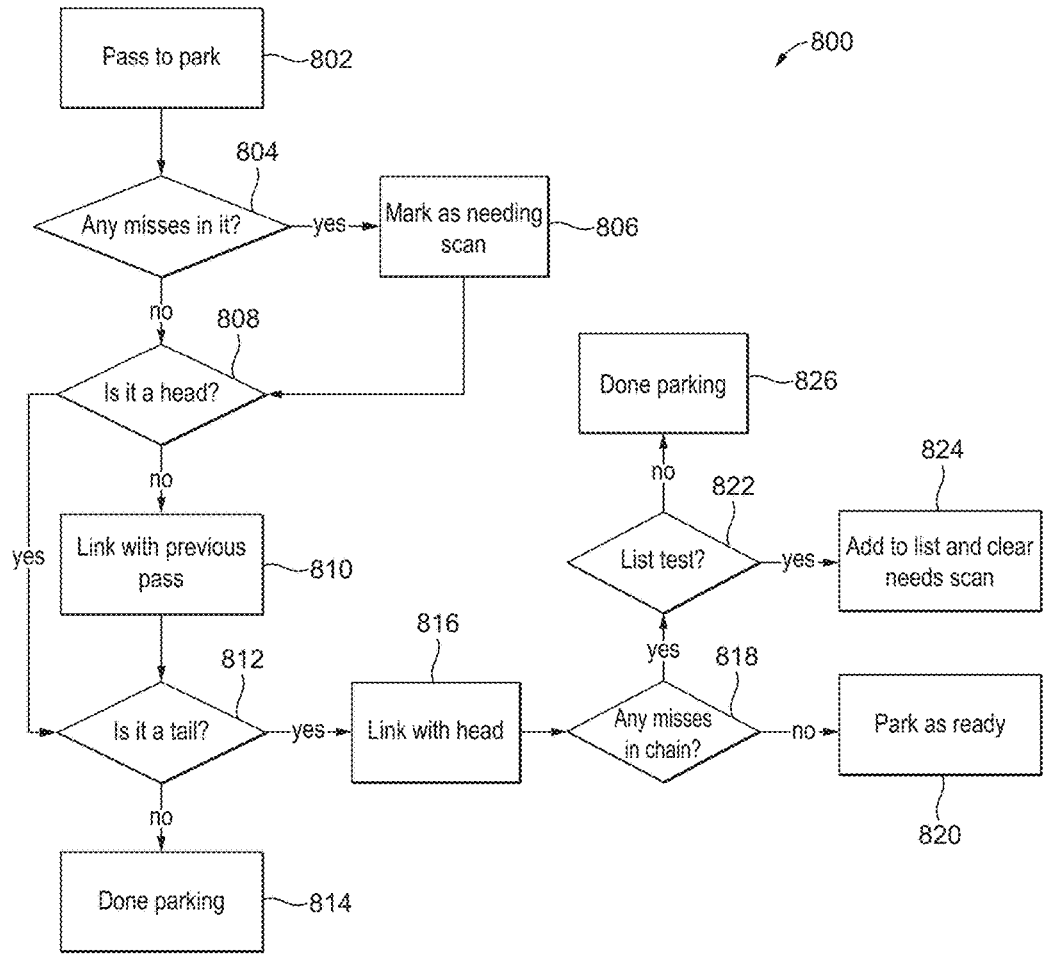
FIG. 8 shows a method of adding a texture processing pass to a record of processing passes stored in a buffer according to an embodiment of the present technology.

FIG. 8 shows in more detail a method 800 of adding or "parking" a texture processing pass in a parking buffer as would be performed by the parking buffer allocator 602 of FIGS. 6 and 7 during one cycle of operation.

At step 802 the parking of a processing pass begins. Then, at step 804, it is determined whether the data required for the processing pass is stored in the cache. If there are any cache misses then, at step 806, the processing pass is tentatively marked as needing to be scanned. However, if there are no cache misses then there is no need to perform step 806.

In either case, it is then determined, at step 808, if the processing pass is the first or "head" processing pass in a group (sequence or "chain") of one or more related processing passes. If the processing pass is not the first or "head" processing pass, then in step 810 the processing pass is linked with the previous pass in the group (i.e. the record index for the current processing pass under consideration is provided in the "next indicator" for the previous processing pass in the group). In this regard, the record index for the previous processing pass may be temporarily tracked from the previous parking cycle to allow the previous processing pass to be identified in the current parking cycle, so that the next indicator for that previous processing pass can be suitably modified. However, if the processing pass is the first or "head" processing pass then there is no need to perform step 810.

In either case, the record index for the current processing pass under consideration is provided in the next indicator for the current processing pass, such that the current processing pass is made to point to itself for the time being. It is then determined at step 812 if the processing pass is the last or "tail" processing pass in the group. If the processing pass is not the last or "tail" processing pass in the group, then the parking process finishes at step 814. In this case, the next indicator for the current processing pass may be made to point to the next processing pass in the group during a subsequent parking cycle. Again, the record index for the current processing pass may be temporarily tracked to allow the current processing pass to be identified in a subsequent parking cycle, so that the next indicator for the current processing pass can be suitably modified.

However, if the processing pass is the last or "tail" processing pass in the group, then at step 816 the processing pass is marked as such and is linked with the first or "head" processing pass in the group (i.e. the record index for the first or "head" processing pass is provided in the "next indicator" for the current processing pass under consideration). In this regard, the record index for the head processing pass in the group may be temporarily tracked from one or more previous parking cycles to allow this to happen. As will be appreciated, where the group comprises only one processing pass the processing pass may remain linked to itself.

Then in step 818, it is determined whether the data required for the group of processing passes as a whole is stored in the cache. If there are no cache misses for the group of processing passes then in step 820 the group of processing passes is marked as ready to be performed (i.e. the first or "head" processing pass in the group has its ready indicator set). However, if there are cache misses for the group of processing passes then in step 822 it is determined whether the cache misses will be satisfied by fetching a single cache line. If the cache misses will be satisfied by fetching a single cache line, then in step 824, the processing passes of the group are added to a separate cache line list of processing passes that can be satisfied by fetching that single cache line.

The separate cache line list of processing passes can be considered separately from the processing passes in the record. In particular, when the cache line for the separate cache line list is fetched, the initial or "head" processing pass for the processing passes on that list can all be marked as ready to be performed. Accordingly, the processing pass currently being parked does not need to be scanned and so the scan indicator can be cleared in step 824. This use of a separate cache line list will now be described in more detail with reference to FIG. 9.

Figure 9:
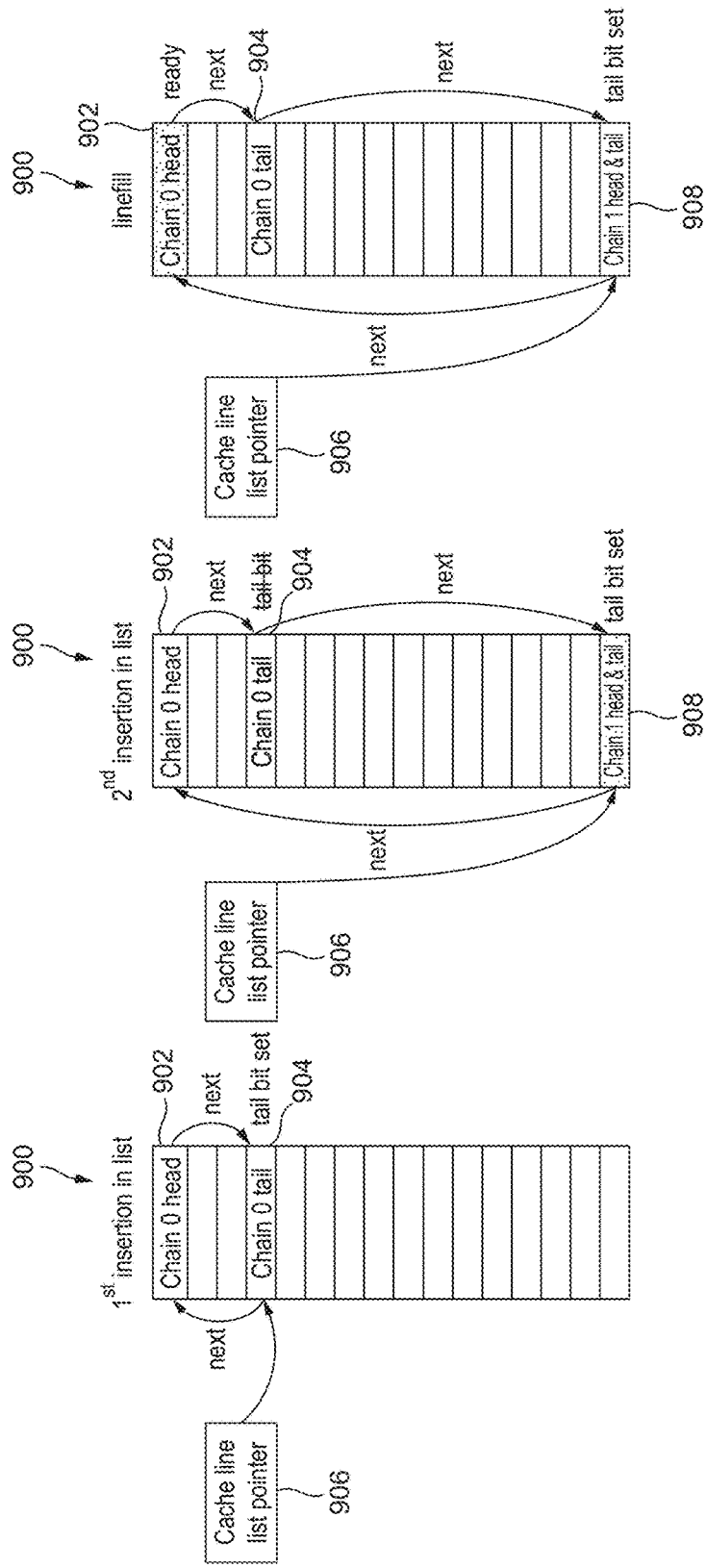
FIG. 9 shows the use of a separate list of texture processing passes that are waiting on data to be fetched into a particular cache line according to an embodiment of the present technology.

FIG. 9 shows how plural groups (sequences or "chains") of processing passes may be linked together in a cache line list 900 to enable those processing passes to be output contiguously when the relevant cache line for the cache line list 900 is fetched. Initially, as is shown in FIG. 9, there is a single group of processing passes in the cache line list 900 that comprises a first (head) processing pass 902 and a second (tail) processing pass 904. As would be the case for the record of processing passes stored in the parking buffer, the entry for the first processing pass 902 points to the entry for the second processing pass 904, and the entry for the second processing pass points to the entry for the first processing pass 902. A cache line list pointer 906 (reference 502 in the embodiment of FIG. 5) also keeps track of the last processing pass to be added to the list and thus points to the entry for the second processing pass 904 of the first group.

Next, a second group comprising a single processing pass 908 is added to the cache line list 900. In order to link the first and second groups together, the entry for the second processing pass 904 of the first group now points to the entry for the single processing pass 908 of the second group and the entry for the single processing pass 908 points to the entry for the first processing pass 902 of the first group. The cache line list pointer 906 also now points to the entry for the single processing pass 908 of the second group. Also, a tail bit for the second processing pass 904 of the first group is cleared and a tail bit of the single processing pass 908 of the second group is set, such that there is only one tail bit set for the linked group of processing passes.

Next, it is determined that the relevant cache line for the processing passes in the cache line list 900 is filled. The first processing pass 902 of the first group is accordingly marked as ready to be performed. In this regard, the first processing pass 902 of the first group can be found using the cache line list pointer 906. In particular, the list pointer 906 points to the entry for the single processing pass 908 of the second group, which in turn has a next indicator that points to the first processing pass 902 of the first group. The first and second groups of processing passes can then be output contiguously from the cache line list 900, starting with the first processing pass 902 of the first group, by following the next indicators.

Referring again to FIG. 8, if the cache misses cannot be satisfied by fetching a single cache line, then in step 826 the process of parking the processing pass can finish.

Figure 10:
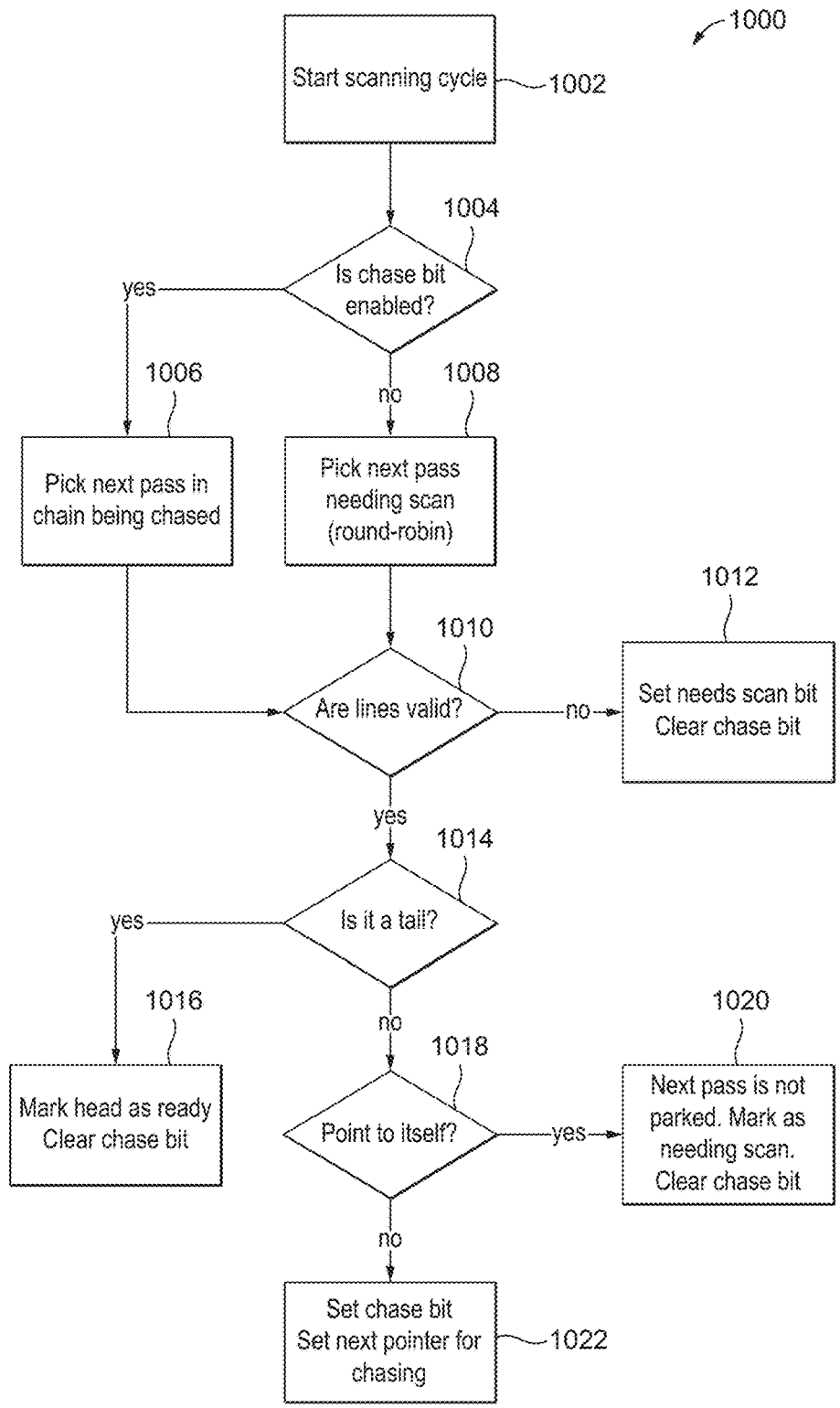
FIG. 10 shows a method of considering a texture processing pass of a record of processing passes stored in a buffer according to an embodiment of the present technology.

FIG. 10 shows in more detail a method 1000 of considering or "scanning" a processing pass of a record of processing passes that is stored in a parking buffer as would be performed by the round robin request scanner/chaser 704 of FIG. 7 during one cycle of operation.

The scanning cycle starts at step 1002. Then at step 1004 it is determined whether a group (sequence or "chain") of plural processing passes is currently being considered (i.e. whether a "chase bit" is enabled). If a group of plural processing passes is currently being considered then, in step 1006, the next processing pass in that group is selected. However, if a group of plural processing passes is not being considered then, in step 1008, the next processing pass that is indicated as needing a scan is selected in a round robin manner.

Then, in step 1010, it is determined whether the data required for the selected processing pass is stored in the cache (i.e. whether all the cache lines required for the processing pass contain valid data). If the data required for the selected processing pass is not stored in the cache, then in step 1012 the scan indicator is set so that the processing pass can be considered again in a subsequent cycle. Also, in step 1012, the chase bit is cleared so that a processing pass from a different group of processing passes can be considered in the next cycle.

However, if the data required for the selected processing pass is stored in the cache, then in step 1014 it is determined whether the processing pass is the last or "tail" processing pass in a group of processing passes. If the processing pass is the last or "tail" processing pass in a group of processing passes, then at step 1016 the first or "head" processing pass in the group of processing passes can be marked as ready for processing. Also, in step 1016, the chase bit is cleared so that a processing pass from a different group of processing passes can be considered in the next cycle.

However, if the processing pass is not the last or "tail" processing pass in a group of processing passes, then at step 1018 it is determined whether the processing pass points to itself. If the processing pass does point to itself, then it can be concluded that the subsequent pass in the group of processing passes has not yet been parked. Thus, in step 1020, the scan indicator is set so that the current processing pass can be considered again in a subsequent cycle. Also, in step 1020, the chase bit is cleared so that a processing pass from a different group of processing passes can be considered in the next cycle.

However, if the processing pass does not point to itself, then in step 1022 the chase bit can be set and a "chasing pointer" can be set to the next processing pass in the group, so that the next processing pass from the group of processing passes can be considered in the next cycle.

In the case of the round robin request scanner 604 of FIG. 6, step 1004, step 1006, and references to setting/clearing the chase bit are omitted from FIG. 10. Also, step 1022 may comprise setting the next pointer to the next pass needing a scan in a round robin manner.

Figure 11:
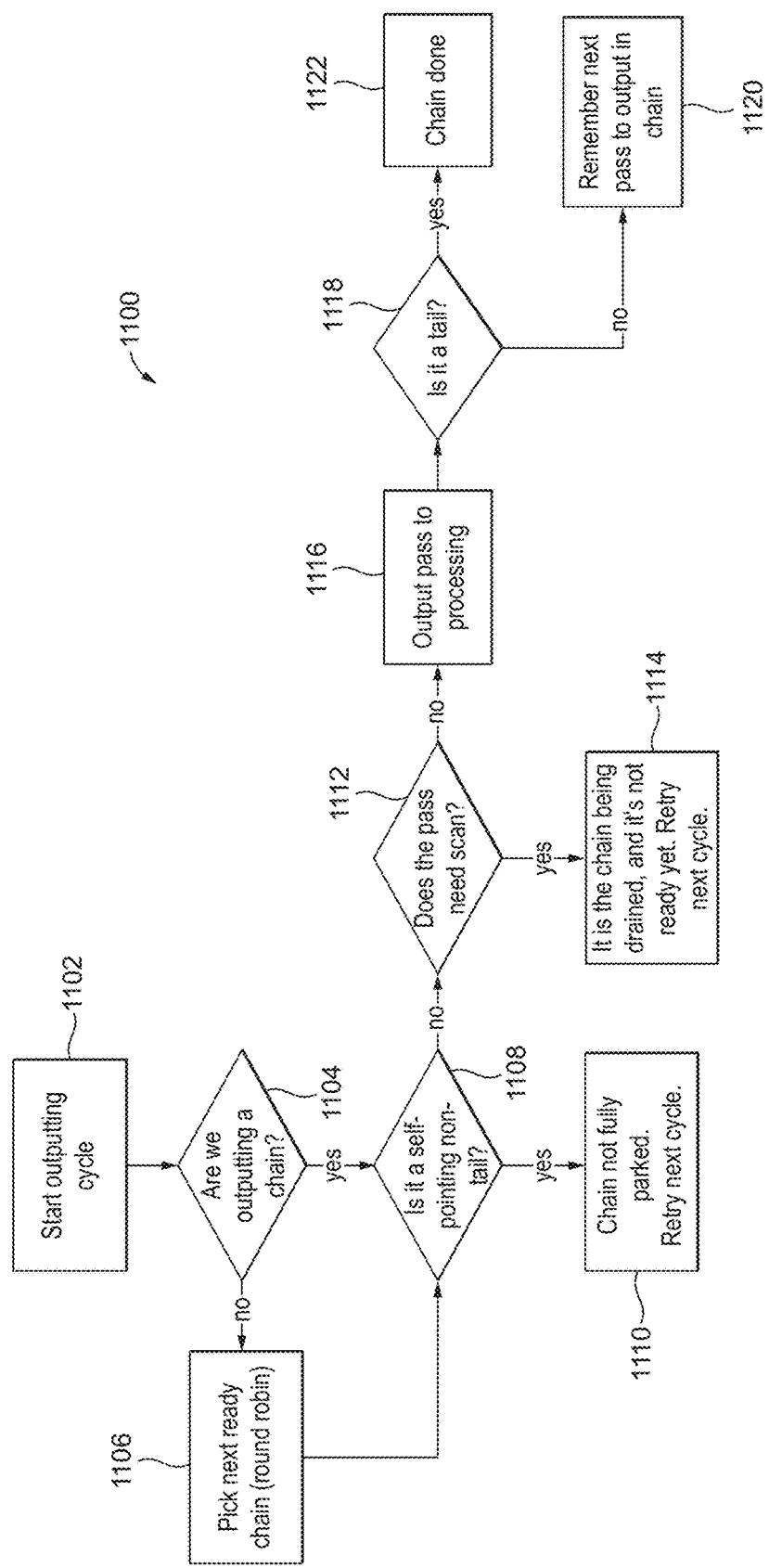
FIG. 11 shows a method of outputting a texture processing pass from a record of processing passes stored in a buffer according to an embodiment of the present technology.

FIG. 11 shows in more detail a method 1100 of outputting a processing pass from a record of processing passes stored in a parking buffer as would be performed by the round robin ready bitscanner 608 and list of chains traverser 712 of FIG. 7 during one cycle of operation.

The outputting cycle begins at step 1102. Then, at step 1104, it is determined whether a group (sequence or "chain") of plural processing passes is currently being output. If a group of plural processing passes is not being output, then in step 1106, a processing pass that is ready to be performed is selected in a round robin manner by the round robin ready bitscanner 608. However, if a group of processing passes is being output then the next processing pass in the group is selected by the list of chains traverser 712.

In either case, in step 1108 it is determined whether the processing pass points to itself but is not the last or "tail" processing pass in a group of processing passes. If the processing pass does point to itself but is not the last or "tail" processing pass in a group of processing passes, then in step 1110 it is concluded that the group of processing passes to which that processing pass belongs is not yet fully parked in the parking buffer and the outputting cycle ends. However, if the processing pass is the last or "tail" processing pass in a group of processing passes or points to another processing pass in a group of processing passes then in step 1112 it is determined whether the processing pass needs to be scanned.

If the processing pass does need to be scanned, then in step 1114 it is determined that the current group of processing passes is being drained from the parking buffer and the outputting cycle ends (the criteria for entering and exiting a process of draining the parking buffer will be described in more detail below). However, if the processing pass does not need a scan then in step 1116 the processing pass is output from the parking buffer and performed.

Then, in step 1118, it is determined whether the processing pass is the last or "tail" processing pass in a group of processing passes. If the processing pass is not the last or "tail" processing pass in a group of processing passes, then it is noted in step 1120 to consider the next processing pass in the group of processing passes in the next outputting cycle. However, if the processing pass is the final processing pass, then in step 1122 it is concluded that the outputting of that group of processing passes is complete and thus a processing pass from a new group of processing passes can be considered in the next outputting cycle.

When a processing pass is output from the record of processing passes, the valid indicator for that processing pass is also unset (cleared) to indicate that the entry in the record of processing passes that corresponded to that processing pass no longer contains valid data.

Figures 12A, 12B:
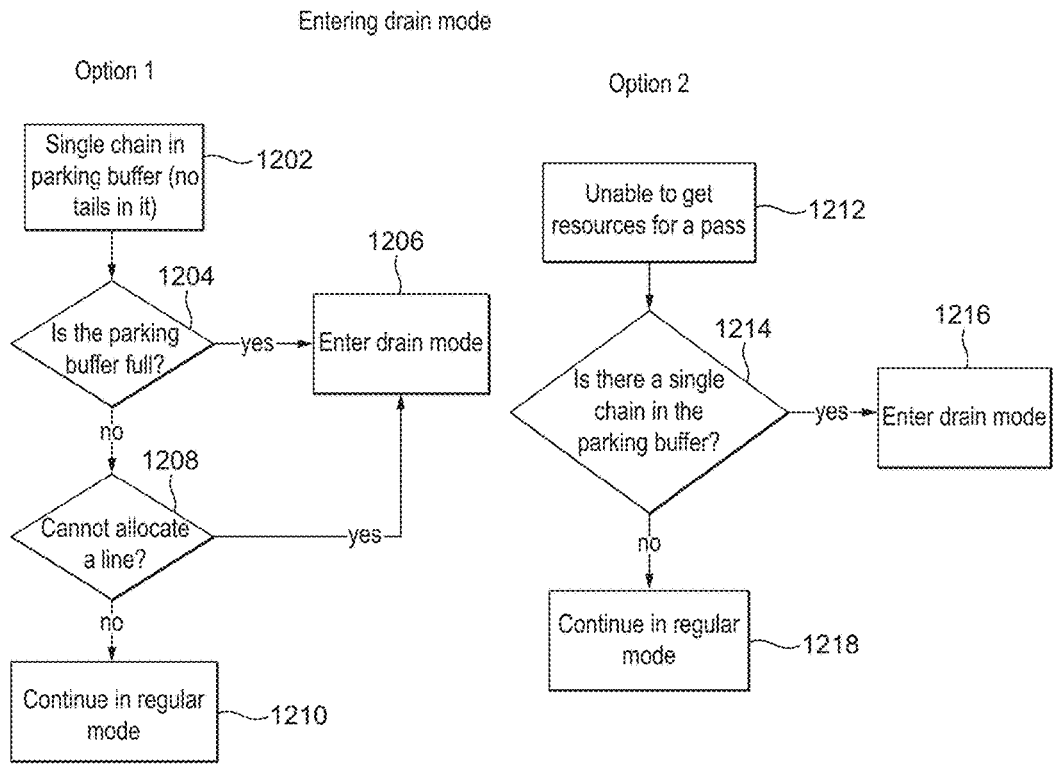
FIG. 12A, FIG. 12B and FIG. 12C show methods of entering and exiting a mode of operation in which texture processing passes are drained from a record of processing passes stored in a buffer according to an embodiment of the present technology.
Figure 12C:
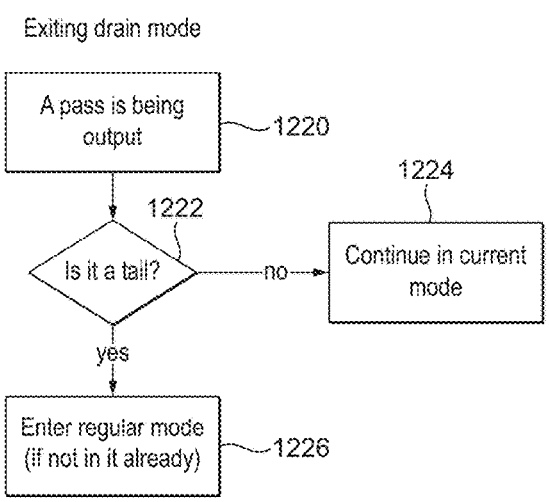

FIGS. 12A, 12B and 12C show methods of entering and exiting a process of draining texture processing passes from a parking buffer. The record in the parking buffer may need to be drained when the record is full or substantially full and/or when no more cache lines are available for allocating to new cache requests (i.e. when all of the cache lines have a reference counter greater than zero and are therefore "locked").

FIG. 12A shows a first option for deciding when the parking buffer should be drained. In this first option, in step 1202, it is detected that there is a single group (sequence or "chain") of processing passes in the parking buffer that has no last or "tail" processing pass. Then, in step 1204 it is determined whether the parking buffer is full. A full parking buffer may give rise to a situation in which no processing passes can be added to the parking buffer but no processing passes can be output from the parking buffer. Thus, if the parking buffer is full, then in step 1206 the parking buffer is drained by outputting the single group of processing passes from the parking buffer (this is despite the full group of processing passes not being determined as ready to be performed).

However, if it is determined that the parking buffer is not full, then in step 1208 it is determined whether any further cache lines are available to be allocated for new cache requests. Having no available cache lines can give rise to a situation in which no new processing passes being added to the parking buffer can become ready to be performed. Thus, if no further cache lines can be allocated, then in step 1206 the parking buffer is drained by outputting the single group of processing passes from the parking buffer (again this is despite the full group of processing passes not being determined as ready to be performed), thereby making further cache lines available for reallocation. However, if further cache lines can be allocated, then in step 1210 the process can continue without needing to drain the parking buffer.

FIG. 12B shows a second option for deciding when the parking buffer should be drained. In this second option, in step 1212 it is determined that no cache lines are available to be allocated for new cache requests. Then, in step 1214 it is determined whether there is a single incomplete group of processing passes in the parking buffer. Again, this can give rise to a situation in which no processing passes in the parking buffer can become ready to be performed. Thus, in step 1216 the parking buffer is drained by outputting the single group of processing passes from the parking buffer (again this is despite the full group of processing passes not being determined as ready to be performed). However, if there is not only a single incomplete group of processing pass in the parking buffer, then in step 1218 the process can continue without needing to drain the parking buffer since there will be one or more other complete groups of processing passes in the parking buffer that can be output instead.

FIG. 12C then shows a method of exiting a process of draining the parking buffer. In step 1220, it is determined that a processing pass is being output. Then in step 1222, is determined whether the processing pass is the last or "tail" processing pass in a group of processing passes being drained. If the processing pass is not the last or "tail" processing pass in a group of processing passes being drained, then in step 1224 the draining process continues by outputting the current processing pass and selecting the next processing pass in the group of processing passes being drained. Conversely, if the processing pass is the last or "tail" processing pass in a group of processing passes being drained, then the single group of processing passes that was in the parking buffer has now been output and so in step 1226 is determined that it is no longer necessary to drain the parking buffer.

It should be noted here that processing passes may still be added to the record during the draining process (if one or more new cache lines are available or are not required) and that processing passes in the record may still be considered (scanned) during the draining process, however only the single group of processing passes being drained will be output from the record during the draining process. This can help to ensure that the potentially problematic single group of processing passes is output from the record and performed, whilst still allowing the record of processing passes to be updated where possible.

Although the above embodiments have been described with particular reference to the operation of graphics processing systems (and in particular in relation to texture data in graphics processing systems), the technology described herein can be used in any data processing system where plural processing passes are to be performed and in which data to be used in those processing passes is to be cached.

It can be seen from the above that embodiments of the technology described herein can provide an efficient way to keep track of processing passes that require data to be fetched into a local cache and to identify processing passes that are ready to be performed. For example, embodiments of the present technology have been shown to perform within 0.4% of an idealised fully associative processing pass tracker, whereas FIFO based arrangements have been shown to drop performance by 8.1% on average and up to 34.5% in the worst case. This is achieved in embodiments of the technology described herein by maintaining a record of a set of processing passes to be performed in a parking buffer, and by performing cycles of operation in which it is considered whether or not the data required for a subset of processing passes is stored in a local cache, wherein the subset of processing passes that is considered in a subsequent scan of the record comprises at least one processing pass that was not considered in the previous scan of the record, regardless of whether or not the data considered in the previous scan is determined as being stored in the cache.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system that comprises processing pass circuitry configured to perform processing passes for one or more data processing operations, the method comprising:
 storing, in a cache that is local to the processing pass circuitry, data required by the processing pass circuitry when performing processing passes for one or more data processing operations; and
 storing, in a buffer, a record of a set of processing passes to be performed by the processing pass circuitry for one or more data processing operations;
 the method further comprising:

in a first cycle of operation, performing a first scan of the record of processing passes, wherein the first scan comprises considering a first subset of one or more of, but not all of, the set of processing passes in the record of processing passes, and wherein considering the first subset comprises determining whether or not data that is required when performing the one or more processing passes of the first subset is stored in the cache; and in a second cycle of operation, performing a second scan of the record of processing passes, wherein the second scan comprises considering a second subset of one or more of, but not all of, the set of processing passes in the record of processing passes, and wherein considering the second subset comprises determining whether or not data that is required when performing the one or more processing passes of the second subset is stored in the cache;

wherein the second subset that is considered in the second scan comprises at least one processing pass that was not considered in the first scan, regardless of whether or not data that is required when performing the one or more processing passes of the first subset is stored in the cache.

2. A method as claimed in claim 1, wherein:

the data processing system comprises a graphics processing system, the processing pass circuitry comprise graphics texture processing pass circuitry, the processing passes comprise processing passes for one or more graphics texture processing operations, and the data that is required when performing the processing passes comprises graphics texture data.

3. A method as claimed in claim 1, further comprising:

adding processing passes to the record of processing passes, wherein the processing passes are added to the record of processing passes regardless of whether or not the data that is required for those processing passes is stored in the cache.

4. A method as claimed in claim 1, wherein:

an entry in the record of processing passes for a processing pass comprises a scan indicator that indicates whether or not it can be considered if data required when performing that processing pass is stored in the cache; and the method further comprises using the scan indicator for a particular processing pass to determine whether or not to consider if data required when performing that processing pass is stored in the cache.

5. A method as claimed in claim 1, wherein:

considering the first subset of one or more processing passes in the first cycle of operation comprises considering one or more processing passes of a group of related processing passes but not considering one or more other processing passes of the group of related processing passes; and considering the second subset of one or more processing passes in the second cycle of operation comprises considering the one or more other processing passes of the group of related processing passes.

6. A method as claimed in claim 1, wherein:

an entry in the record of processing passes for a processing pass of a group of one or more related processing passes comprises a next indicator that indicates a next processing pass in the group of one or more related processing passes; and the method further comprises using a next indicator for a particular processing pass of a particular group of one or more related processing passes that is considered in the first cycle of operation to determine a next processing pass in the particular group of one or more related processing passes that is to be considered in the second cycle of operation.

7. A method as claimed in claim 1, wherein:

an entry in the record of processing passes for a processing pass comprises a ready indicator that indicates whether or not that processing pass is ready to be performed; and the method further comprises determining whether data that is required for a group of one or more related processing passes is stored in the cache and, when it is determined that the data that is required for the group of one or more related processing passes is stored in the cache, setting a ready indicator for one or more processing passes of the group of one or more related processing passes to indicate that the group of one or more related processing passes is ready to be output from the record and performed.

8. A method as claimed in claim 1, further comprising:

maintaining a separate cache line list comprising one or more groups of one or more related processing passes that are waiting on data to be fetched into only a particular set of one or more cache lines; and determining that the data for the particular set of one or more cache lines has been fetched into the cache and, responsive to determining that the data for the particular set of one or more cache lines has been fetched into the cache, indicating that the one or more groups of one or more related processing passes listed in the cache line list are ready to be output from the record and performed.

9. A method as claimed in claim 1, further comprising:

determining that the record of processing passes comprises a single incomplete group of related processing passes and, responsive to determining that the record of processing passes comprises a single incomplete group of related processing passes, switching to a mode of operation in which one or more processing passes of the single incomplete group of related processing passes are output from the record and performed.

10. A data processing system, the system comprising:

processing pass circuitry configured to perform processing passes for one or more data processing operations;

a cache that is local to the processing pass circuitry, the cache being configured to store data required by the processing pass circuitry when performing processing passes for one or more data processing operations;

a buffer configured to store a record of a set of processing passes to be performed by the processing pass circuitry for one or more data processing operations; and buffer management circuitry configured to:

in a first cycle of operation, perform a first scan of the record of processing passes, wherein the first scan comprises considering a first subset of one or more of, but not all of, the set of processing passes in the record of processing passes, and wherein considering the first subset comprises determining whether or not data that is required when performing the one or more processing passes of the first subset is stored in the cache; and in a second cycle of operation, perform a second scan of the record of processing passes, wherein the second scan comprises considering a second subset of one or more of, but not all of, the set of processing passes in the record of processing passes, and wherein considering the second subset comprises determining whether or not data that is required when performing the one or more processing passes of the second subset is stored in the cache;

wherein the second subset that is considered in the second scan comprises at least one processing pass that was not considered in the first scan, regardless of whether or not data that is required when performing the one or more processing passes of the first subset is stored in the cache.

11. A system as claimed in claim 10, wherein:

the data processing system comprises a graphics processing system, the processing pass circuitry comprise graphics texture processing pass circuitry, the processing passes comprise processing passes for one or more graphics texture processing operations, and the data that is required when performing the processing passes comprises graphics texture data.

12. A system as claimed in claim 10, wherein the buffer management circuitry is further configured to:

add processing passes to the record of processing passes, wherein the processing passes are added to the record of processing passes regardless of whether or not the data that is required for those processing passes is stored in the cache.

13. A system as claimed in claim 10, wherein:

an entry in the record of processing passes for a processing pass comprises a scan indicator that indicates whether or not it can be considered if data required when performing that processing pass is stored in the cache; and the buffer management circuitry is further configured to use a scan indicator for a particular processing pass to determine whether or not to consider if data required when performing that processing pass is stored in the cache.

14. A system as claimed in claim 10, wherein:

when considering the first subset of one or more processing passes in the first cycle of operation, the buffer management circuitry is configured to consider one or more processing passes of a group of related processing passes but not consider one or more other processing passes of the group of related processing passes; and when considering the second subset of one or more processing passes in the second cycle of operation, the buffer management circuitry is configured to consider the one or more other processing passes of the group of related processing passes.

15. A system as claimed in claim 10, wherein:

an entry in the record of processing passes for a processing pass of a group of one or more related processing passes comprises a next indicator that indicates a next processing pass in the group of one or more related processing passes; and the buffer management circuitry is further configured to use a next indicator for a particular processing pass of a particular group of one or more related processing passes that is considered in the first cycle of operation to determine a next processing pass in the particular group of one or more related processing passes that is to be considered in the second cycle of operation.

16. A system as claimed in claim 10, wherein:

an entry in the record of processing passes for a processing pass comprises a ready indicator that indicates whether or not that processing pass is ready to be performed; and the buffer management circuitry is further configured to determine whether data that is required for a group of one or more related processing passes is stored in the cache and, when it is determined that the data that is required for the group of one or more related processing passes is stored in the cache, setting the ready indicator for one or more processing passes of the group of one or more related processing passes to indicate that the group of one or more related processing passes is ready to be output from the record and performed.

17. A system as claimed in claim 10, wherein the buffer management circuitry is further configured to:

maintain a separate cache line list comprising one or more groups of one or more related processing passes that are waiting on data to be fetched into only a particular set of one or more cache lines; and determine that the data for the particular set of one or more cache lines has been fetched into the cache and, responsive to determining that the data for the particular set of one or more cache lines has been fetched into the cache, indicate that the one or more groups of one or more related processing passes listed in the cache line list are ready to be output from the record and performed.

18. A system as claimed in claim 10, wherein:

the buffer management circuitry is further configured to determine that the record of processing passes comprises a single incomplete group of related processing passes and, responsive to determining that the record of processing passes comprises a single incomplete group of related processing passes, switch to a mode of operation in which one or more processing passes of the single incomplete group of related processing passes are output from the record and performed.

19. A non transient computer readable storage medium storing computer software code which when executing on a processor performs a method of operating a data processing system, the system comprising processing pass circuitry configured to perform processing passes for one or more data processing operations, the method comprising:

storing, in a cache that is local to the processing pass circuitry, data required by the processing pass circuitry when performing processing passes for one or more data processing operations; and storing, in a buffer, a record of a set of processing passes to be performed by the processing pass circuitry for one or more data processing operations;

the method further comprising:

in a first cycle of operation, performing a first scan of the record of processing passes, wherein the first scan comprises considering a first subset of one or more of, but not all of, the set of processing passes in the record of processing passes, and wherein considering the first subset comprises determining whether or not data that is required when performing the one or more processing passes of the first subset is stored in the cache; and in a second cycle of operation, performing a second scan of the record of processing passes, wherein the second scan comprises considering a second subset of one or more of, but not all of, the set of processing passes in the record of processing passes, and wherein considering the second subset comprises determining whether or not data that is required when performing the one or more processing passes of the second subset is stored in the cache;

wherein the second subset that is considered in the second scan comprises at least one processing pass that was not considered in the first scan, regardless of whether or not data that is required when performing the one or more processing passes of the first subset is stored in the cache.

* * * * *